US011900477B1

(12) United States Patent
Kushniruk et al.

(10) Patent No.: US 11,900,477 B1
(45) Date of Patent: Feb. 13, 2024

(54) ENABLING REVIEWER TO ASSESS PRIVATE DATA SET OF OTHER PARTY USING CUSTOM PARAMETER VALUES

(71) Applicant: AVALARA, INC., Seattle, WA (US)

(72) Inventors: Marshal Kushniruk, Bainbridge Island, WA (US); Cassandra Searles, Seattle, WA (US); William Ingram, Seattle, WA (US); Gregory T. Kavounas, Bellevue, WA (US)

(73) Assignee: Avalara, Inc., Seattle, WA (US)

( * ) Notice: Subject to any disclaimer, the term of this patent is extended or adjusted under 35 U.S.C. 154(b) by 265 days.

(21) Appl. No.: 16/801,337

(22) Filed: Feb. 26, 2020

Related U.S. Application Data

(60) Provisional application No. 62/915,868, filed on Oct. 16, 2019.

(51) Int. Cl.
  *G06Q 40/12* (2023.01)
  *G06Q 40/10* (2023.01)
  *G06F 21/60* (2013.01)

(52) U.S. Cl.
  CPC ......... *G06Q 40/123* (2013.12); *G06F 21/604* (2013.01); *G06Q 40/10* (2013.01)

(58) Field of Classification Search
  None
  See application file for complete search history.

(56) References Cited

U.S. PATENT DOCUMENTS

| | | | | |
|---|---|---|---|---|
| 5,772,251 A | * | 6/1998 | Fleck | B42D 15/00 283/115 |
| 5,799,283 A | * | 8/1998 | Francisco | G06Q 20/02 235/375 |
| 6,052,710 A | * | 4/2000 | Saliba | G06F 9/547 709/203 |
| 6,189,005 B1 | * | 2/2001 | Chakrabarti | G06F 16/2477 |
| 6,317,750 B1 | * | 11/2001 | Tortolani | G06F 40/18 |
| 7,512,623 B2 | * | 3/2009 | Apps | G06N 5/025 |
| 7,783,536 B2 | | 8/2010 | William et al. | |
| 7,933,803 B1 | | 4/2011 | Nadler et al. | |
| 8,620,578 B1 | | 12/2013 | Brown et al. | |
| 8,725,407 B2 | | 5/2014 | Hurley et al. | |
| 9,760,915 B2 | * | 9/2017 | Pavlou | G06Q 30/04 |
| 10,354,213 B1 | * | 7/2019 | Ings | G06Q 10/067 |
| 10,445,818 B1 | | 10/2019 | Chowdhary | |
| 10,769,611 B2 | | 9/2020 | McNeel | |
| 10,878,357 B1 | * | 12/2020 | Rosenman | G06Q 10/067 |
| 2001/0034748 A1 | * | 10/2001 | Bimson | G06F 40/103 715/239 |
| 2001/0054172 A1 | * | 12/2001 | Tuatini | G06F 8/427 717/100 |
| 2002/0138765 A1 | | 9/2002 | Fishman et al. | |
| 2004/0002906 A1 | * | 1/2004 | Von Drehnen | G06Q 30/0641 705/31 |
| 2004/0215599 A1 | * | 10/2004 | Apps | G06Q 30/02 |
| 2005/0209939 A1 | * | 9/2005 | Joseph | G06Q 40/00 705/31 |
| 2005/0251733 A1 | * | 11/2005 | Elkady | G06F 40/143 715/209 |

(Continued)

*Primary Examiner* — Fateh M Obaid
(74) *Attorney, Agent, or Firm* — Jeremiah J. Baunach; VLP Law Group LLP

(57) ABSTRACT

Embodiments of the invention relate to generating compliance scores based on first party data on a second party system for viewing by a third party.

17 Claims, 16 Drawing Sheets

(56) References Cited

U.S. PATENT DOCUMENTS

| | | | |
|---|---|---|---|
| 2006/0069658 A1* | 3/2006 | Haller | G06Q 20/0855 |
| | | | 705/78 |
| 2006/0111990 A1* | 5/2006 | Cohen | G06F 40/103 |
| | | | 705/32 |
| 2007/0136158 A1 | 6/2007 | Rawlings et al. | |
| 2007/0136159 A1* | 6/2007 | Rawlings | G06Q 20/14 |
| | | | 705/31 |
| 2009/0006149 A1* | 1/2009 | Yarter | H04L 63/20 |
| | | | 705/7.41 |
| 2010/0082685 A1* | 4/2010 | Barr Hoisman | G06F 21/6218 |
| | | | 707/E17.059 |
| 2012/0259752 A1* | 10/2012 | Agee | G06Q 40/00 |
| | | | 705/35 |
| 2013/0013471 A1* | 1/2013 | Fishman | G06Q 40/00 |
| | | | 705/31 |
| 2015/0058962 A1* | 2/2015 | Mottes | H04L 63/10 |
| | | | 726/9 |
| 2016/0055322 A1* | 2/2016 | Thomas | H04L 63/0876 |
| | | | 726/7 |
| 2019/0287182 A1* | 9/2019 | Chetal | G06Q 10/06398 |
| 2020/0052908 A1* | 2/2020 | Thitron | H04L 63/20 |
| 2020/0090171 A1* | 3/2020 | Bajpai | G06Q 30/018 |

* cited by examiner

*METHODS FOR
DATA REVIEW PLATFORM*

...........(TAX SUPPORT PROVIDER)...........

| Review company data by individual factor evaluation | Review company data by total risk score | Logout |

CONFIDENTIAL                    CUSTOMER COMPANY

| | | Value | Individual Evaluation (R/Y/G) | |
|---|---|---|---|---|
| F1 | # of months selling | 38 | 0-12/13-36/37+ (change) | GREEN |
| F2 | % of invoices unpaid for 6 (change) months | 14 | 100-30/29-10/9-0 (change) | YELLOW |
| F3 | % inaccurate invoices | 7 | 100-30/29-10/9-0 (change) | GREEN |
| F4 | # of months remitting taxes | 35 | 0-12/13-36/37+ (change) | GREEN |
| F5 | Lateness in tax remittance (% of returns) | 3 | 90-10/9-1/0 (change) | YELLOW |
| F6 | Lateness in tax remittance (average, days) | 8 | 90-10/9-1/0 (change) | YELLOW |
| F7 | % likelihood of tax audit for industry | 9 | 90-20/19-11/10-0 (change) | GREEN |
| F8 | % likelihood of tax audit for jdx | 15 | 90-20/19-11/10-0 (change) | YELLOW |
| F9 | Any adverse public records | 0 | 1+/no yellow/0 (change) | GREEN |

FIGURE 11

ENABLING REVIEWER TO ASSESS PRIVATE DATA SET OF OTHER PARTY USING CUSTOM PARAMETER VALUES

CROSS-REFERENCE TO RELATED APPLICATIONS

This application claims priority to U.S. Provisional Patent Application No. 62/915,868, filed 16 Oct. 2019, which is incorporated herein, in its entirety, by this reference.

BACKGROUND

When businesses sell or buy goods, they are required by law to compute the amounts of money they owe as taxes to various tax jurisdictions, and then pay ("remit") these amounts to the tax jurisdictions. If the businesses fail to accurately report and pay taxes they owe, they may become subject to audits and fines—and ignorance of the law is not an excuse.

There are many types of taxes for such businesses. Such taxes include sales tax, use tax, excise tax, value-added tax, industry-specific taxes, cross-border taxes, and so on. Further, for a single transaction, taxes may be due to more than one tax jurisdiction, such as states, localities within the states, etc.

Determining the taxes due is often very complex. There are over 10,000 tax jurisdictions in the US, and millions of taxability rules related to various products and services. Complexities in determining the tax due may arise from the location of the buyer, the seller, a distributor, etc. For example, some state and local authorities have origin-based tax rules, which means that a sales tax is charged from the seller's location; other state and local authorities have destination-based tax rules, which means that a sales tax is charged from the buyer's location.

Additional complexities arise from the fact that different tax jurisdictions charge different percentage rates. These different tax jurisdictions can be different states, counties, cities, municipalities, special taxing jurisdictions, and so on.

In addition to the amount of the tax, sellers of goods are subjected to many requirements about the taxes they owe. In particular, a seller must determine whether, and when, they must collect taxes in each tax jurisdiction. For example, for each state, a seller may need to register with that state's taxing agency, set up internal processes for collecting sales tax in accordance with the tax rules of the state, keep records for the collected sales tax, file reports with the state, and finally pay the tax to the state.

Sellers may further try to look for instances when they do not owe sales tax. For a first example, in some instances a tax jurisdiction may offer a temporary tax holiday. For a second example, a tax jurisdiction may exempt the sale of certain products and services from sales tax, but that is not uniform across states; for instance, in 2018, the sale of cowboy boots was exempt from sales tax in Texas, but not in New York. For a third example, when a seller buys certain items for resale, the transaction may be exempt from sales tax, as long as the seller creates and maintains proper certificates to that effect.

Businesses generally collect information relating to their operations, such as by using enterprise resource planning ("ERP") software applications and accounting applications. ERP applications manage information relating to a business's activities, such as sales, resource management, production, inventory management, delivery, billing, and so on. Accounting applications manage a business's accounting information, such as purchase orders, sales invoices, payroll, accounts payable, accounts receivable, and so on.

ERP applications, accounting applications, e-commerce applications and other conventionally used applications generally cannot provide accurate tax information, such as when transactions are complex or span geographical boundaries. In particular, such applications may over- or under-estimate tax owed to governments, for example by failing to consider municipal taxes. Moreover, such applications generally do not provide an ability for businesses to model the impact that various contemplated changes may have on the business's bottom line. As an example, these applications cannot model the impact on taxes of transferring production of goods from one geographical area to another, effectively changing the tax jurisdiction.

SUMMARY

Embodiments of the invention relate to generating compliance scores based on first party data on a second party system for viewing by a third party.

A computer implemented method is disclosed. The computer implemented method includes receiving, by a computer system of a second party, an authorization from a first party that a third party be permitted to access first party data stored by the second party. The computer implemented method includes permitting, by the computer system and responsive to the authorization, the third party to access the stored first party data. The computer implemented method includes selecting, by the computer system, computational rules to apply to the stored first party data. The computer implemented method includes computing, by a scoring engine of the computer system, a compliance score based on the computational rules and the stored first party data. The computer implemented method includes outputting the compliance score.

A system for generating a compliance score is disclosed. The system includes one or more processors. The system includes a non-transitory computer-readable storage medium having instructions stored thereon which, when executed by the one or more processors, result in operations. The operations include receiving, by a computer system of a second party, an authorization from a first party that a third party be permitted to access first party data stored by the second party. The operations include permitting, by the computer system and responsive to the authorization, the third party to access the stored first party data. The operations include selecting, by the computer system, computational rules to apply to the stored first party data. The operations include computing, by a scoring engine of the computer system, a compliance score based on the computational rules and the stored first party data. The operations include outputting the compliance score.

A computer implemented method is disclosed. The computer implemented method includes receiving, by a third party from a computer system of a second party, an authorization from a first party to access first party data stored by the second party on the computer system. The computer implemented method includes accessing, pursuant to the authorization, the stored first party data in the computer system. The computer implemented method includes causing the computer system to select at least one of a plurality of computational rules. The computer implemented method includes causing a scoring engine of the computer system to apply the selected at least one of a plurality of computational rules to the stored first party data for computing a compliance score. The computer implemented method includes causing the computer system to output the compliance score to the third party.

A system for generating a compliance score is disclosed. The system includes one or more processors. The system includes a non-transitory computer-readable storage medium having instructions stored thereon which, when executed by the one or more processors, result in operations. The operations include receiving, by a third party from a computer system of a second party, an authorization from a first party to access first party data stored by the second party on the computer system. The operations include accessing, pursuant to the authorization, the stored first party data in the computer system. The operations include causing the computer system to select at least one of a plurality of computational rules. The operations include causing a scoring engine of the computer system to apply the selected at least one of a plurality of computational rules to the stored first party data for computing a compliance score. The operations include causing the computer system to output the compliance score to the third party.

A computer implemented method is disclosed. The computer implemented method includes causing, by a first party computing device, first party data to be stored in a computer system of a second party in communication with the first party computing device. The computer implemented method includes accessing, by a user interface of the computer system, a scoring engine stored on the computer system. The computer implemented method includes causing, by the user interface, the scoring engine to apply at least one stored computational rule to the stored first party data to compute a compliance score and display the compliance score on the user interface. The computer implemented method includes providing, by the user interface, a network address of a third party. The computer implemented method includes causing, by the user interface, the computer system to transmit to the network address an authorization to the third party to access the stored first party data on the computer system.

A system for generating a compliance score is disclosed. The system includes one or more processors. The system includes a non-transitory computer-readable storage medium having instructions stored thereon which, when executed by the one or more processors, result in operations. The operations include causing, by a first party computing device, first party data to be stored in a computer system of a second party in communication with the first party computing device. The operations include accessing, by a user interface of the computer system, a scoring engine stored on the computer system. The operations include causing, by the user interface, the scoring engine to apply at least one stored computational rule to the stored first party data to compute a compliance score and display the compliance score on the user interface. The operations include providing, by the user interface, a network address of a third party. The operations include causing, by the user interface, the computer system to transmit to the network address an authorization to the third party to access the stored first party data on the computer system.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

FIGS. 8-12 show user interfaces for generating and displaying compliance scores, according to embodiments.

DETAILED DESCRIPTION

Embodiments of the invention relate to generating and obtaining compliance scores of a first party's compliance with one or more requirements with a second party computer system on behalf of a third party.

Figure 1:
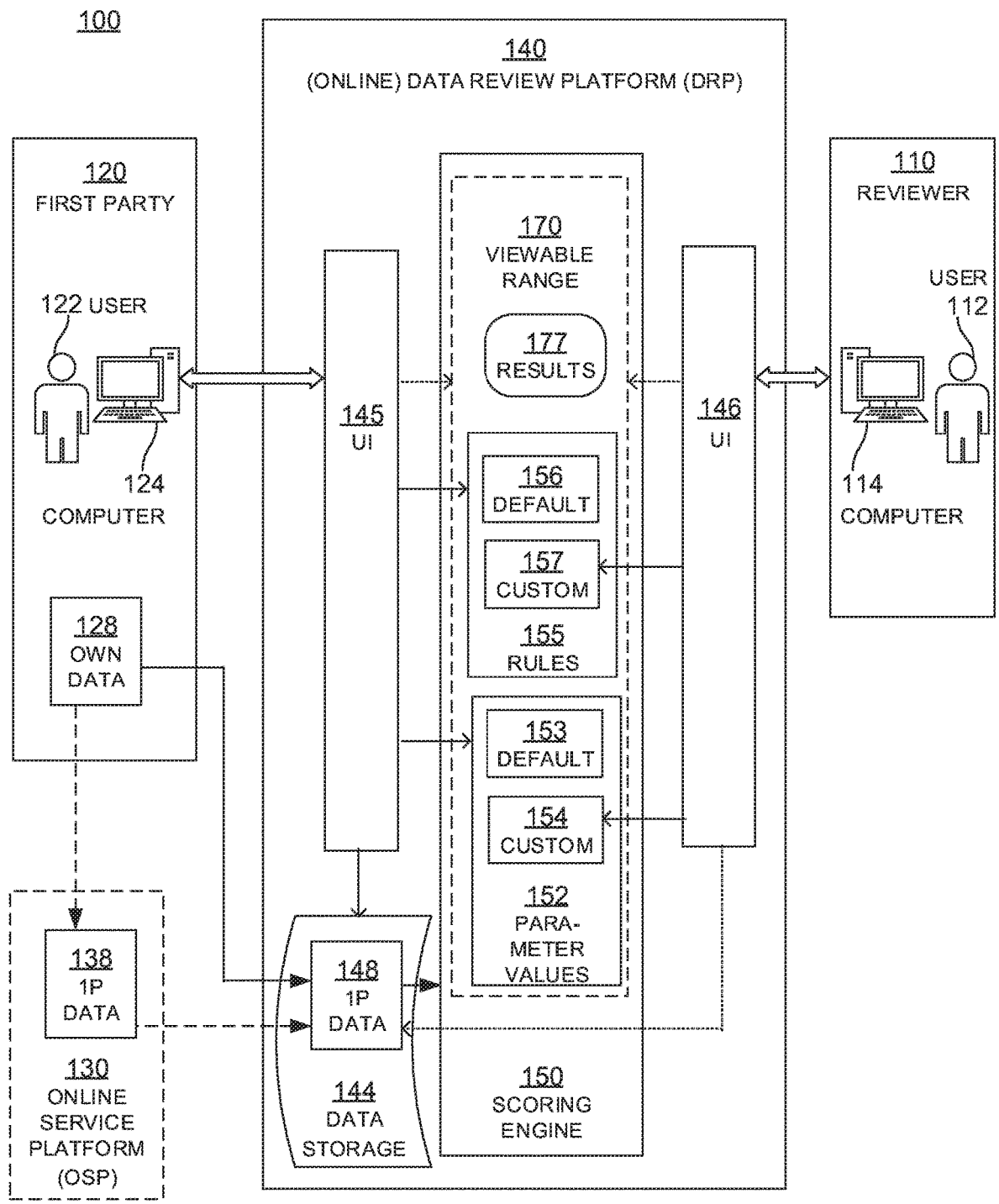
FIG. 1 shows a sample configuration that generates compliance scores of a first party on a second party computer system for a third party.

FIG. 1 shows a sample configuration 100 that may generate a score of a first party on a second party computer system for a third party. The score may be a compliance score. The configuration 100 includes a reviewer 110, a third party 120, and an (online) data review platform ("DRP") 140. The configuration 100 optionally also includes an online service platform ("OSP") 130. The DRP 140 may optionally be part of OSP 130. The OSP 130 may be a data storage facility, an ERP, a service platform, etc. At least some of the first party data 138 on the OSP 130 may be generated on the OSP 130. For example, the OSP 130 may be a sales tax service platform, online marketplace, or the like and the first party data 138 may include invoice data, account data, sales tax data, or the like, generated on the OSP 130.

The DRP 140 is in electronic communication with one or more of the first party 120, the online service platform ("OSP") 130, and the reviewer 110. For example, the DRP 140 may be accessible to the reviewer 110 and the first party 120 via a network, such as via the world wide web, a LAN, or the like. A user 112 may be a representative of the reviewer 110 (e.g., third party) and may access and communicate with the DRP 140 (e.g., second party) via a computer 114, such as via the network. A user 122 of the first party 120 may access and communicate with the DRP 140 via a computer 124, such as via the network. The reviewer 110, the first party 120, and the OSP 130 may electronically communicate with the DRP 140 via interfaces of the DRP. The OSP 130 may communicate with the DRP 140 through one or more application programming interfaces (APIs) (not shown). The first party 120 may electronically access and communicate with the OSP 130 via a network using one or more APIs (not shown). The computing devices of one or more of the DRP 140, the first party 120, the reviewer 110, and the OSP 130 may thus form a network for generating compliance scores with the first party data using the scoring engine 150 of the DRP 140. Each of these devices may amount to a corresponding system, be part of a corresponding system, and so on.

The DRP 140 may thus generate compliance scores, shown as results 177, using the scoring engine 150 and the first party data 148. The one or more criteria are examined by one or more computational rules 155 of the scoring engine 150 being applied to the first party data 148. Accordingly, a third party reviewer 110 may utilize the DRP 140 (second party) to determine a first party's qualifications for a benefit offered by the third party, based on the first party data 148. The third party reviewer 110 may not even view the first party data 148. Instead, the DRP 140 accesses and utilizes the first party data 148 in a selected way to produce the compliance scores.

The first party data 148 may be provided to and stored in the DRP 140 in data storage 144 therein. For example, the first party 120 may input at least some of the first party data 148 from the first party's own data 128. The DRP 140 includes a user interface (UI) 145 for communicating with the user 122 of the first party 120 via the computer 124 and a user interface 146 for communicating with the user 112 of the reviewer 110 via the computer 114. UIs 145, 146 may be implemented in a number of ways, for example web-based, be parts of a software connector, and so on. The first party's own data 128 may be stored on a device separate from the DRP 140, and data 128 may be transferred thereto, either directly via the user interface 145 or an API (not shown), or indirectly via the OSP 130. For example, the first party 120 may upload at least some of the first party's own data 128 into data storage 144 of the DRP 140 via the user interface 145 (and computer 124) or via one or more APIs. The first party 120 may transfer at least some of the first party's own data 128 to the OSP 130 to form at least some of the first party data 138 stored on the OSP 130. At least some of the first party data 138 may be transferred to the data storage 144 to be stored as stored first party data 148.

The first party's own data 128, the first party data 138, or the stored first party data 148 may include sales data, tax data (e.g., sales tax remittance data), invoice data, account data, address data, public records, investigative data, or histories of any of the foregoing, of the first party 120 or clients of the first party 120. For example, one or more datasets within the first party's own data 128, the first party data 138, or the stored first party data 148 may include one or more of sales transaction data, sales tax data, accuracy of invoice data, address data, or open invoice data corresponding to the first party stored on a service platform computing system (OSP 130). The first party's own data 128, the first party data 138, or the stored first party data 148 may contain sensitive data or data that the first party does not wish to disseminate. Accordingly, the first party 120 may limit or control access of outside entities, such as the reviewer 110 or DRP 140, to use the first party's own data 128, the first party data 138, or the stored first party data 148.

The first party 120 may provide authorization for one or more of the DRP 140 (e.g., second party) or the reviewer 110 (e.g., third party) to access and utilize at least some of the first party's own data 128, the first party data 138, or the stored first party data 148. The authorization may be electronic authorization from the first party 120. For example, the first party 120 may provide electronic authorization for the reviewer 110 or DRP 140 to use one or more of the first party's own data 128, the first party data 138, or the stored first party data 148, via the user interface 145. The authorization may include a digital code previously established on behalf of the first party 120 to grant access to the stored first party data 148. The authorization may be received by one or more of the first party 120, the reviewer 110 (third party), or the DRP 140 (second party). For example, the reviewer 110 may receive authorization from the first party 120 via the DRP 140 at a network address of the reviewer 110.

Responsive to receiving the authorization, the DRP 140 may access on behalf of the reviewer 110 or permit the reviewer 110 to access the stored first party data 148. For example, the DRP 140 may permit the computer 114 to access the stored first party data 148 in the data storage 144 via the user interface 146 by receiving an authorization code from the reviewer or recognizing a network address of the reviewer after authorization is given.

The data storage 144 may be accessed by the scoring engine 150 or the reviewer 110 to apply the one or more computational rules 155 to at least a portion of the stored first party data 148. In some examples, the scoring engine 150 or the reviewer 110 may fetch specific data sets or subsets of the stored first party data 148 for use therein. The first party 120 or the reviewer 110 may specify one or more portions of the stored first party data 148 to be utilized by the scoring engine 150.

The scoring engine 150 includes machine readable and executable instructions to query at least a portion of the stored first party data 148 to determine compliance with one or more criteria of the scoring engine 150. The scoring engine 150 stores one or more computational rules 155 for calculating one or more compliance scores with the first party data 148. The one or more computational rules 155 include electronic instructions for determining the satisfaction of, or a level or satisfaction of, one or more requirements or criteria set forth in the instructions. The requirements, criteria, or the computational rules 155 may be selected or established by one or more of the reviewer 110, the third party 120, or the DRP 140. Accordingly, the compliance scores indicate the presence of, or a magnitude of, the first party's satisfaction of one or more requirements of the reviewer 110 for providing a benefit to the third party 120, based on one or more portions of the stored first party data 148.

In some examples, the scoring engine 150 includes a plurality of scoring engines. Each of the plurality of scoring engines may be programmed to perform a different function or use different default computational rules than other scoring engines.

The one or more computational rules 155 may include a plurality of computational rules for calculating one or more sub-scores. The computational rules 155 includes two types, default 156 and custom 157. Each of the plurality of computational rules may be applied to a portion of the stored first party data to calculate the plurality of sub-scores. The one or more sub-scores may aggregate (e.g., add up) to form the compliance score. Each of the one or more sub-scores may be an individual compliance score. For example, each of the one or more sub-scores may demonstrate compliance with a specific requirement. Accordingly, the plurality of sub-scores may add up to form a larger overall picture of the first party's compliance with a plurality of requirements.

The one or more computational rules selected for use in the scoring engine 150 may be selected from computational rules 155 stored in a memory of DRP 140. At least some of the stored computational rules 155 may be presented to the first party 120 or the reviewer 110 (third party) via the user interface 145 or 146 in a viewable range 170. The viewable range 170 is a portions of the scoring engine 150 that is viewable to a user via a user interface, such as UIs 145, and 146. For example, the viewable range 170 may present the one or more of the computational rules 155 (for use by the scoring engine 150 with the first party data 148 to produce the results 177) to the first party 120 or the reviewer 110. In embodiments, the viewable range 170 may show more or fewer elements than indicated in FIG. 1.

The default computational rules 156 may include popular computational rules. One or more of the first party 120 or the reviewer 110 may select one or more specific computational rules from the default computational rules 156, via the user interface 145 or 146, respectively. The DRP 140 may receive instructions from one or more of the user 122 (first party 120) or the user 112 (reviewer 110 or third party) to use one or more computational rules stored in the DRP 140 (in the scoring engine 150).

The custom computational rules 157 may include one or more computational rules that are modifiable or selected (e.g., preselected) by one or more of the first party 120 or the reviewer 110. The custom computational rules 157 may be uploaded to the scoring engine 150 by the reviewer 110 via the user interface 146 or the first party 120 via the user interface 145. One or more of the first party 120 or the reviewer 110 may provide instructions to the DRP 140 to utilize one or more of the default computational rules 156 or the custom computational rules 157 against the stored first party data 148.

The parameter values 152 are values that are used to weight one or more of the computational rules, sub-scores, or compliance scores. The parameter values 152 include two types, default 153 and custom 154, similarly with stored rules 155. The parameter values 152 may include one or more parameter modifiers, which weight one or more of the computational rules, sub-scores, or compliance scores according to a selected value. For example, the reviewer 110 may instruct the DRP 140 to apply an "increase weight by two" parameter modifier to a sub-score corresponding to an amount of outstanding sales tax remittance obligations. Accordingly, the sub-score corresponding to an amount of outstanding sales tax remittance obligations may form a larger part of an aggregate compliance score. Thus, beyond selecting the computational rules themselves, the reviewer 110 or the first party 120 may control how much the results of each computational rule contribute to a final compliance score. The custom computational rules 157 and the custom parameter values 154 may be adjusted after the scoring engine 150 operates on the first party data 148, to offer different insights into the first party data 148.

The computational rules 155 may be applied to all of, a portion of, or portions of the stored first party data 148. For example, the computational rules 155 may include instructions to query all of or only specific portions of the stored first party data 148. One or more of the first party 120 or the reviewer 110 may select (e.g., electronically identify) specific portions of the stored first party data 148 on which to apply the computational rules 155 in the scoring engine 150.

The scoring engine 150 may compute the compliance score(s) using the computational rules 155 and the first party data 148. The compliance score(s) may be presented as results 177. For example, the results 177 may be output to one or more of the reviewer 110 or the first party 120 via the viewable range 170. The results 177 may be output to one or more of the reviewer 110 or the first party 120 via electronic communication. For example, the DRP 140 may send an electronic message including the results 177 to one or more of the reviewer 110 or the first party 120.

The scoring engine 150 may also store computational rules for categorizing one or more sub-scores or the compliance score to one or more score bands describing preselected value ranges for the one or more sub-scores or compliance score. For example, the score bands may include value ranges of sub-scores or compliance scores associated with certain values or outcomes according to one or more computational rules, such as high compliance, medium compliance, and low compliance; low risk, neutral risk, or high risk; or the like. The score bands, and the place of the first party's compliance score(s) therein, may be visually presented to one or more of the first party 120 or the reviewer 110. For example, the score bands may be presented as green for a range of values that are associated with high compliance with one or more computational rules, yellow for a range of values that are associated with medium compliance, and red for a range of values that are associated with low compliance. The computational rules may include rules to categorize each sub-score of a plurality of sub-scores and a total compliance score that is a total of one or more of the sub-scores into respective value ranges. The computational rules (e.g., the custom computational rules 157) may include value ranges selected by one or more of the first party 120 or the reviewer 110 (third party). The compliance score(s) may be presented as results 177 to one or more of the first party 120 or the reviewer 110 with, or as a part of, preselected value ranges, such as in a score band associated therewith.

The first party 120 may provide authorization for the DRP 140 to share the results 177 with third parties, such as the reviewer 110. For example, the first party 120 may provide a network address of the third party and may input instructions into the DRP 140 to output authorization to the third party to access one or more of the first party data 148 or the results 177. Accordingly, the first party 120 may control access by third parties to its own data and results calculated therefrom.

Figure 2:
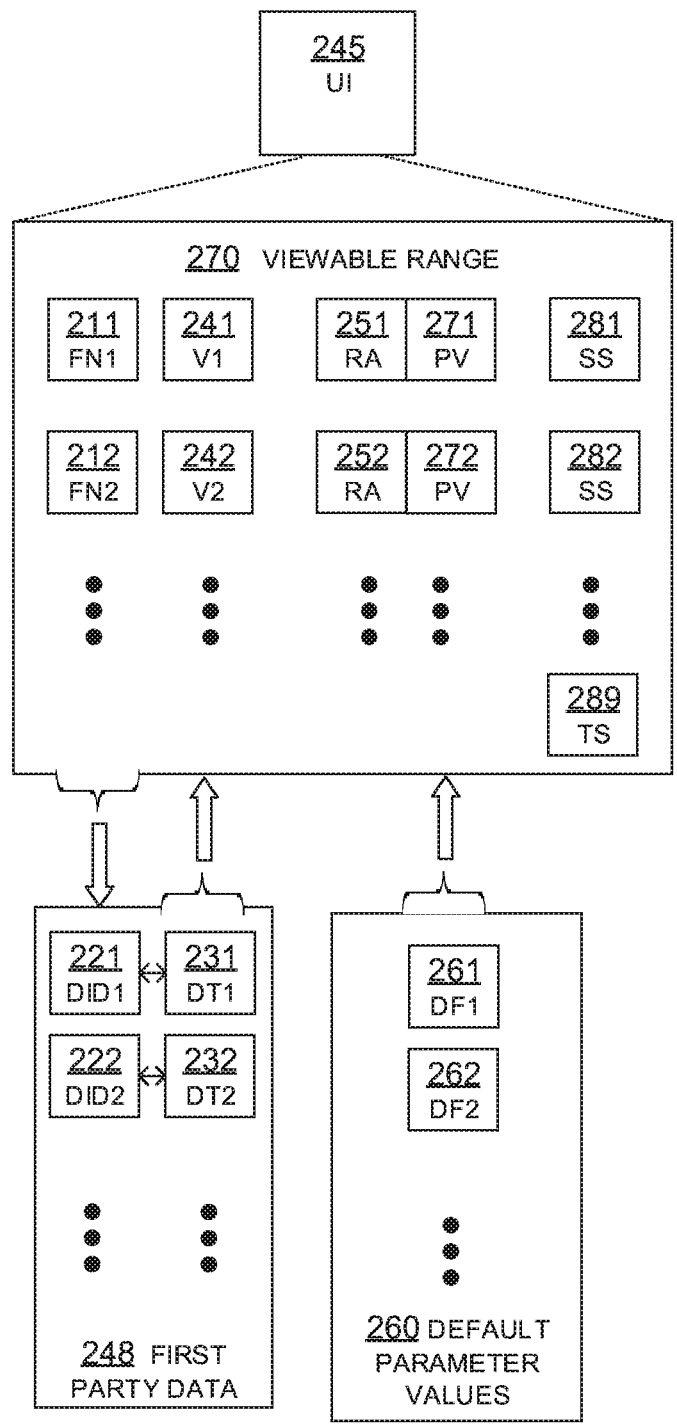
FIG. 2 depicts sample elements of sample user interfaces made according to embodiments.

FIG. 2 depicts a sample user interface 245, according to embodiments. The user interface 245 is generated by the DRP 140 and may be presented to one or more of the first party 120 or the reviewer 110 via or as the user interface 145 or 146 (FIG. 1), respectively. The user interface 245 displays the viewable range 270. The viewable range 270 may be similar or identical to the viewable range 170 in one or more aspects. For example, the user interface 245 may present the viewable range 270 to one or more of the first party 120 or the reviewer 110.

The viewable range 270 may include field names (FN) for names of fields having selected first party data therein. The field names specify which portions of the first party data are queried by the scoring engine. For example, the field names correspond to specific data identifiers (DIDs) in the first party data 248. The DIDs may be used to fetch the underlying data (DT) from the first party data 248. The data (DT) may be placed into the viewable range 270 as data values (V). The viewable range 270 includes rule appearances (RA) which provides the appearance and name of the computational rule(s) corresponding thereto. For example, the RA may describe the computational rule, the criteria by which the computational rule(s) function, the mathematical functions therein, or the intended outputs of the computational rule(s). The viewable range 270 includes parameter values PV that are modifiers which weight the output of the corresponding computational rules according to the magnitude of the PV. The viewable range 270 includes sub-scores (SS) corresponding to the output of each computational rule applied by the scoring engine. The sub-scores can be added to provide a total score (TS) 289.

The viewable range 270 may include a first field name 211, a first value 241, a first rule appearance 251, a first parameter value 271, and a first sub-score 281. The viewable range 270 may include a second field name 212, a second value 242, a second rule appearance 252, a second parameter value 272, and a second sub-score 282. The viewable range 270 may include an additional field names, additional values, additional rule appearances, additional parameter values, and additional sub-scores.

In practice, the scoring engine may utilize the field names 211 and 212 to call the data 231 and 232 at the corresponding DIDs 221 and 222. The data 231 and 232 may be imported into the viewable range 270 as values 241 and 242. The values 241 and 242 are used to compute sub-scores 281 and 282 using the corresponding rules underlying rule appearances 251 and 252 and parameter values 271 and 272. The parameter values 271 and 272 may be imported as corresponding default parameter values 261 and 262 from a default parameter values storage 260, such as was shown for default parameter values 153. The parameter values 271 and 272 are used to weight the values calculated by the computational rules corresponding to the rule appearances 251 and 252 by multiplying said values by the parameter values 271 and 272 to calculate the sub-scores 281 and 282. The sub-scores 281 and 282 add to provide the total score 289.

One or more of the first party 120, or the reviewer 110 if authorized, may view or edit one or more fields of the viewable range 270 via user interface 245. For example, one or more of the first party 120 or the reviewer 110 may view, select, or edit one or more of the field name 211 or 222, the computational rules corresponding to rule appearance 251 or 252, or the parameter values 271 or 272.

Various user interfaces may be utilized to provide different viewable information to one or more of the first party 120 or the reviewer 110. For example, at least some of the fields displayed in user interface 245 may be protected from viewing from one or more of the first party 120 or the reviewer 110.

Any number of field names (FN), data identifiers (DID), data (DT), data values (V), rule appearances (RA) and corresponding computational rules, parameter values (DV), sub-scores (SS) in addition to the two described above with respect to FIG. 2 may be utilized by the DRP to determine one or more compliance scores in a scoring engine.

Figure 3A:
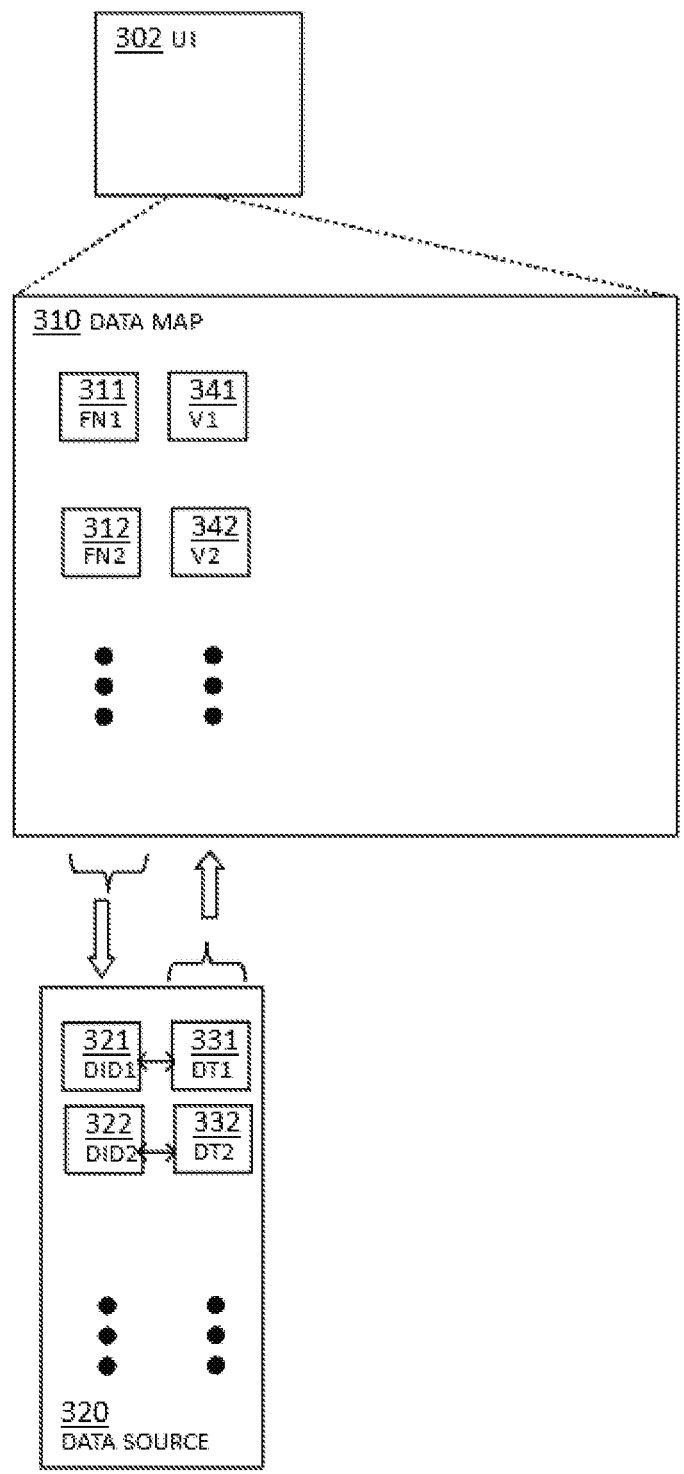
FIGS. 3A-3E are sample snapshots of elements of FIG. 2, according to embodiments.

FIGS. 3A-3E depict a sample user interface 302 at various points of generating one or more compliance scores, according to embodiments. In FIG. 3A, the viewable fields in the user interface 302 are limited to the fields related to the first party data. For example, the user interface 302 displays data that is shown as a data map 310, which is a way of displaying information about the first party data used in a scoring engine. The user interface 302 and the data map 310 therein may be presented to one or more of the first party 120 and the reviewer 110. In such examples, the fields therein may be viewable or editable by the viewing party. For example, only the first party may be able to view the fields related to first party data in some embodiments.

The data map 310 includes the field names 311 and 312 and the corresponding values 341 and 341. The values 341 and 342 are data values from the first party data. The field names 311 and 312 specify which portions of the first party data are queried by the scoring engine. The data corresponding to the field names 311 and 312 may be retrieved from a data source, such as data source 320. The data source 320 may be located in the DRP 140 (FIG. 1). The data source 320 may be dedicated only to the first party data or may include a plurality of parties' data. In any case, the field names 311 and 312 may correspond to one or more selected data fields of the first party data in the data source 320.

The field names 311 and 312 correspond to specific data identifiers (DIDs) 321 and 322 in the first party data, respectively. The DIDs 321 and 322 may be used to fetch the underlying data (DT) 331 and 332, respectively, from the first party data. The data (DT) 331 and 332 may be imported into the data map 310 as data values (V) 341 and 342, respectively. The viewable ranges may include additional field names and additional values. Correspondingly, the data source 320 may include additional DIDs and DT.

Figure 3B:
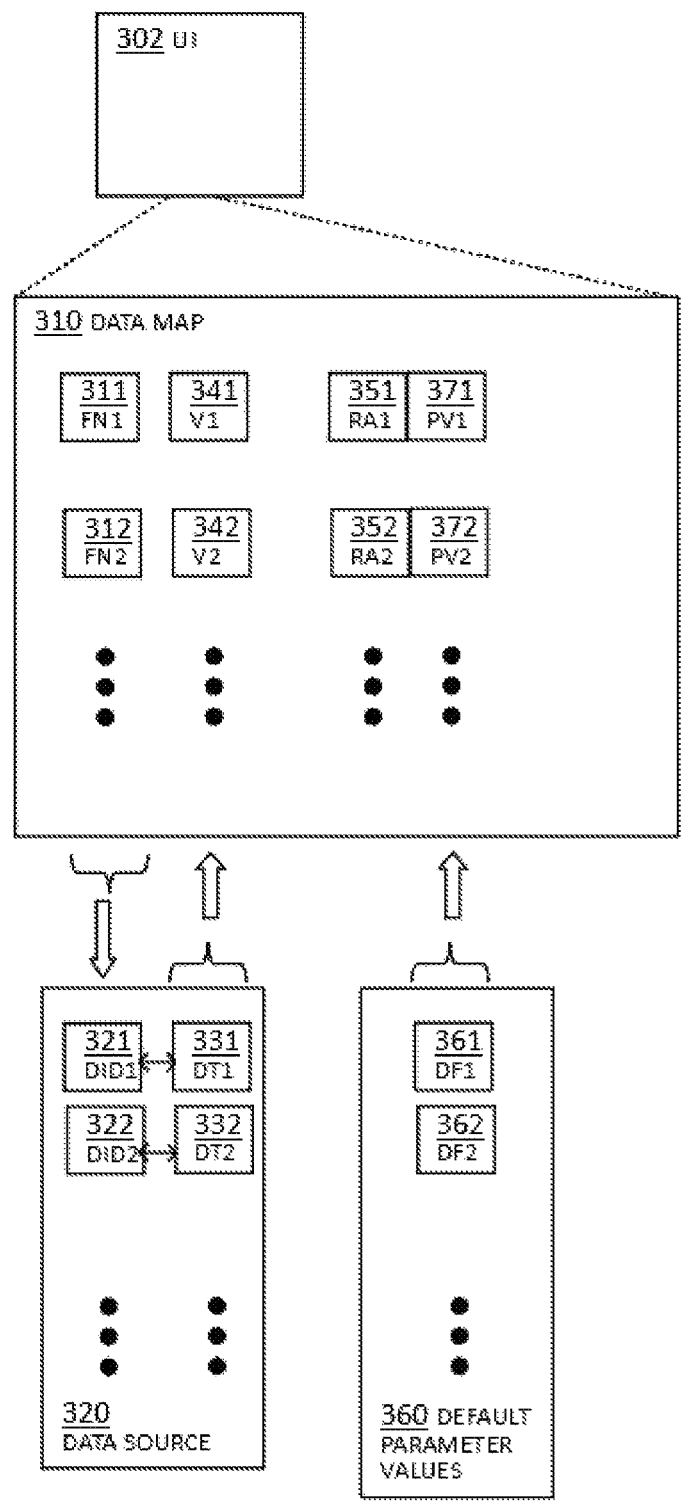

In FIG. 3B, additional fields are visible in the data map 310. In FIG. 3B, the viewable fields in the data map 310 include field names 311 and 312, data values 341 and 342, rule appearance 351 and 352, and parameter values 371 and 372. For example, the rule appearances 351 and 352 corresponding to underlying computational rules may be presented to the user for viewing, selection, or alteration by one or more of the first party or the reviewer. The rule appearance 351 or 352 may be similar or identical to any of the rule appearances disclosed herein. A user may select or modify one or more specific computational rules by selecting the same according to the corresponding rule appearance. The parameter values 371 and 372 may be viewable in the data map 310. The parameter values 371 and 372 may be provided from default values 361 and 362. The parameter values 371 and 372 may be accessible (e.g., viewable or modifiable) to a selected party. For example, only the reviewer may be able to view and modify the rule appearances 351 and 352 and the parameter values 371 and 372. In such examples, only the field numbers and data values may be accessible to the first party. Accordingly, the DRP 140 may limit access to information stored therein.

Figure 3C:
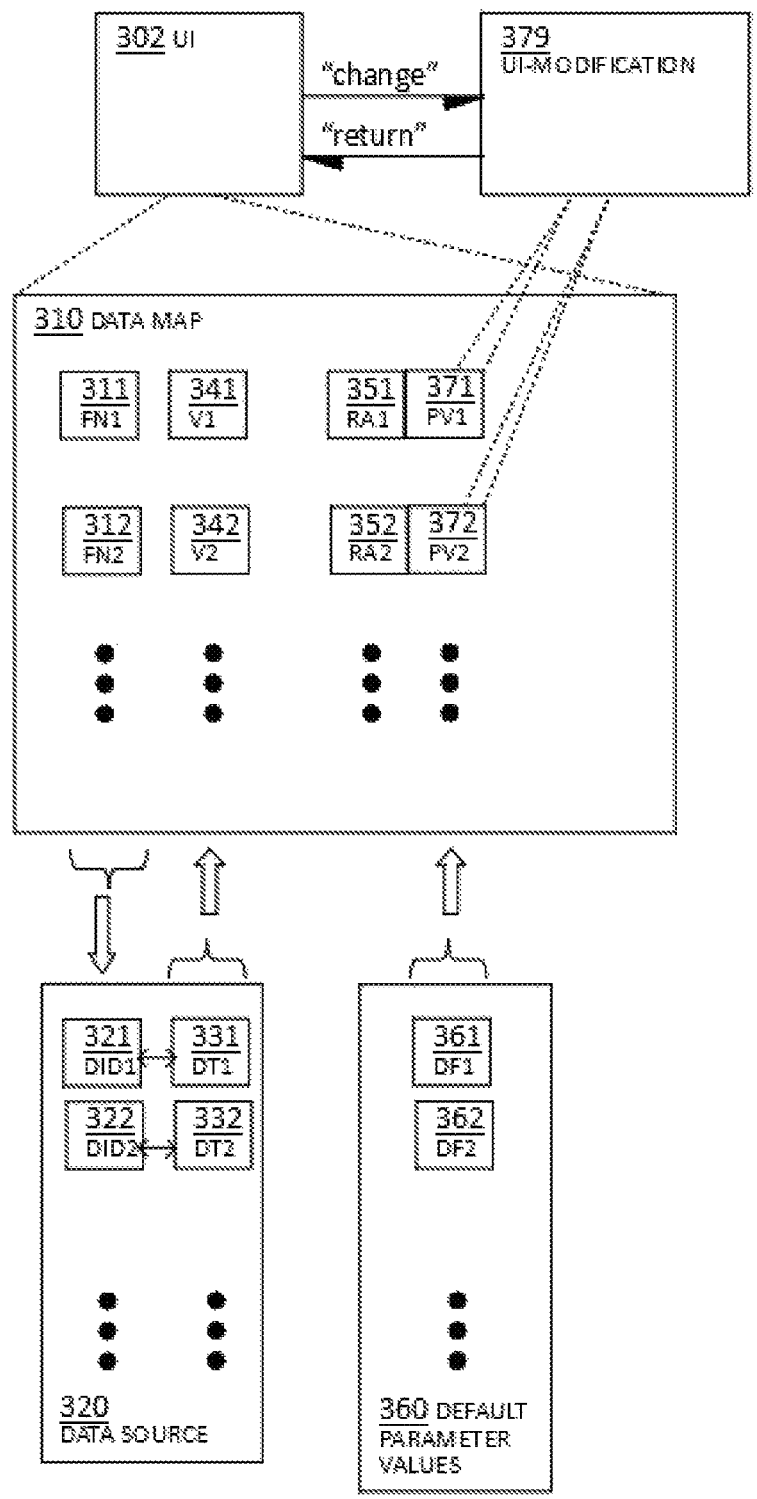

The parameter values 371 and 372 may be modified to be instead custom parameter values, which can operate as modifiers (e.g., multipliers) to selectively weight the results of the computational rules associated therewith. In FIG. 3C, a modification user interface 379 is presented for changing one or more fields in the data map 310. The modification user interface 379 may communicate with or presented via the user interface 302, or 146 of FIG. 1. For example, upon presentation of the data map 310, the modification user interface 379 may be presented to one or more of the first party or the reviewer. The first party or the reviewer may use the modification user interface 379 to change default parameter values 371 and 372. The substituted custom values are also shown as 154 in FIG. 1. The first party or the reviewer may further use the modification user interface 379 to change the rule appearances 351 and 352, and, by extension, the underlying rules that will be used for the computation. The substituted custom rules are also shown as 157 in FIG. 1. In such examples, only the rule appearances 351 and 352 or parameter values 371 and 372 may be displayed for modification in the modification user interface 379.

Presentation of the modification user interface 379 may be responsive to a change request entered in the user interface 302. Responsive thereto, the viewable and changeable fields may be presented via the modification user interface 379. As shown, the first parameter value 371 and the second parameter value 372 may be presented and modified via the modification user interface 379 via the user interface 302. Responsive to changes or confirmation of the first parameter value 371 or the second parameter value 372 the modification user interface 379 may return the changes to the (main) user interface 302 for display thereon.

Figure 3D:
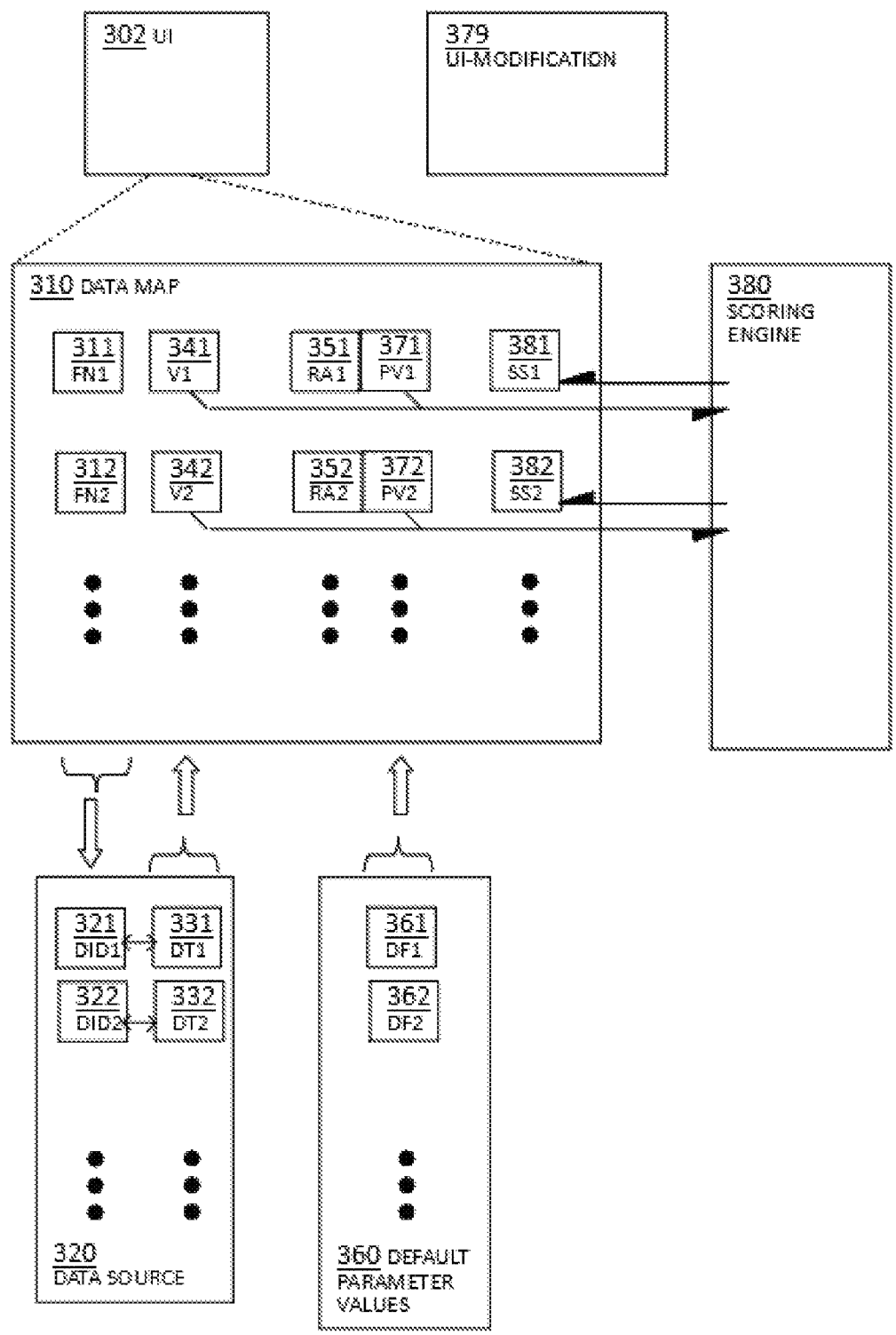

After reviewing or modifying one or more fields in the data map 310, the computational rules may be applied to the data values to produce one or more compliance scores. In FIG. 3D, a scoring engine 380 executes the computational rules on the data values to form one or more sub-scores. The one or more compliance scores may include sub-scores 381 and 382. In such examples, the scoring engine 380 may import or otherwise use the data values 341 and 342, the computational rules corresponding to rule appearances 351 and 352, and the parameter values 371 and 372. The computational rules corresponding to rule appearances 351 and 352 are operated using the data values 341 and 342, to produce one or more raw sub-scores. The raw sub-scores may be modified by the parameter value 371 or 372, respectively. For example, the scoring engine 380 may use the parameter values 371 and 372 to weight the corresponding raw sub-scores according to a magnitude of the parameter values 371 and 372 to form the sub-scores 381 and 382. The scoring engine 380 may output the sub-scores 381 and 382 to the data map 310.

Figure 3E:
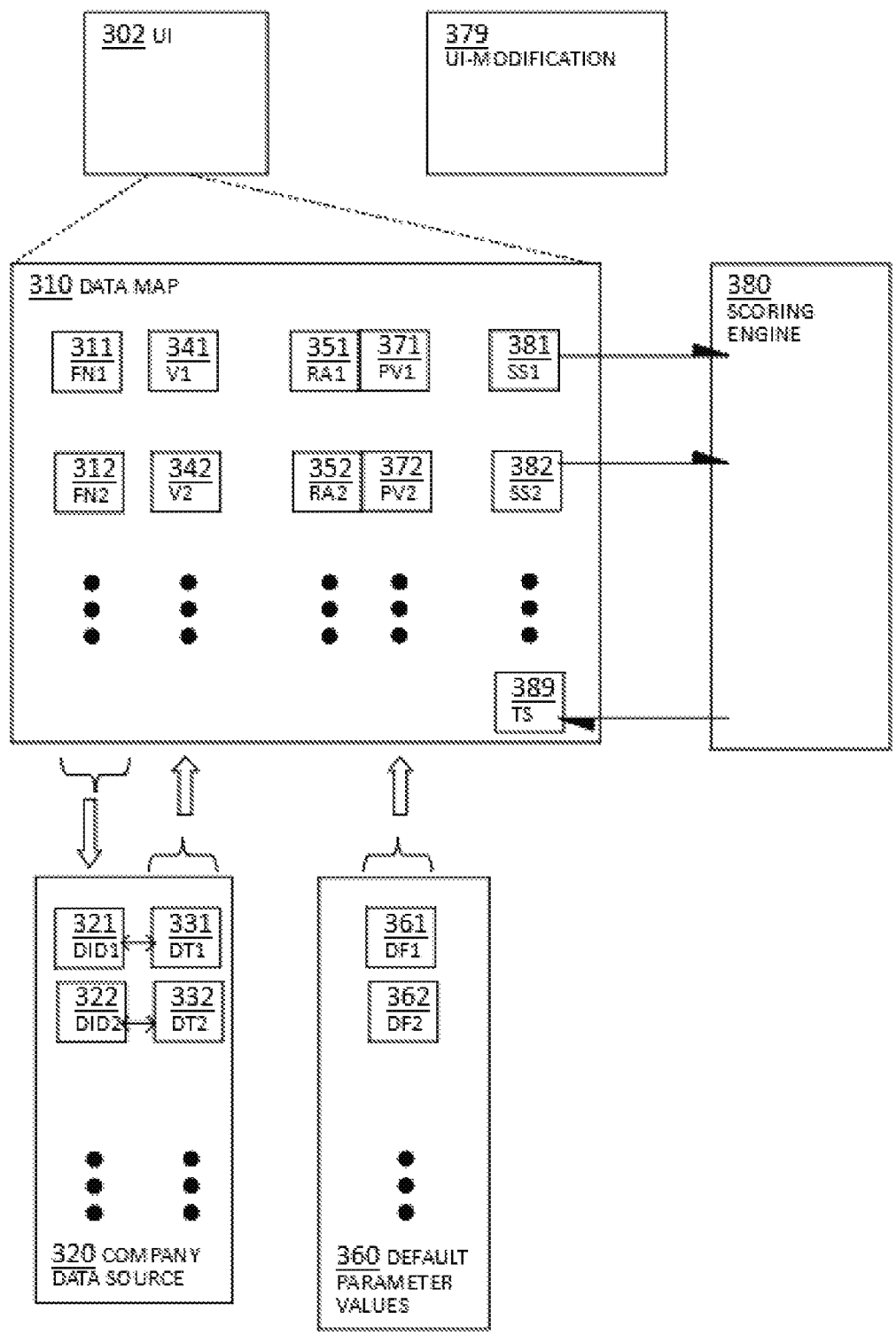

In FIG. 3E, the scoring engine 380 sums up the sub-scores to provide the total score. For example, the sub-scores 381 and 382 may be summed by the scoring engine to generate a total score which is output to the data map 310 as the total score 389. The sub-scores 381 and 382 and the total score 389 may be displayed as the compliance scores to one or more of the first party or the reviewer via the data map 310 of the user interface 302.

As shown, any number of field names (FN), data identifiers (DID), data (DT), data values (V), rule appearances (RA) and corresponding computational rules, parameter values (DV), sub-scores (SS) in addition to the two described above with respect to FIGS. 3A-3E may be utilized by the DRP to determine one or more compliance scores in a scoring engine.

In some examples, only selected fields in the data map 310 may be viewable or editable by a selected party (e.g., the first party or the reviewer). For example, only the first party may view or edit the field names and only the reviewer may view or edit the rule appearances and parameter values in some embodiments. In some embodiments, only the reviewer may view or edit the field names and only the first party may view or edit the rule appearances and parameter values in some embodiments. In some embodiments, only the reviewer may view or edit the field names and only the first party may view or edit the rule appearances and parameter values in some embodiments. In some embodiments, both the reviewer and the first party may view and edit the field names, view appearances, and parameter values.

The DRP may control and limit which parties can view the sub-scores (SS) and total score (TS) in the user interface 302.

The configurations, systems, and user interfaces disclosed herein may be used by one or more of a second party (such as a DRP provider), a third party (such as a reviewer), or the first party to generate and obtain one or more compliance scores on the DRP, based on the first party data and the one or more computational rules, for use by the reviewer (third party).

Figure 4:
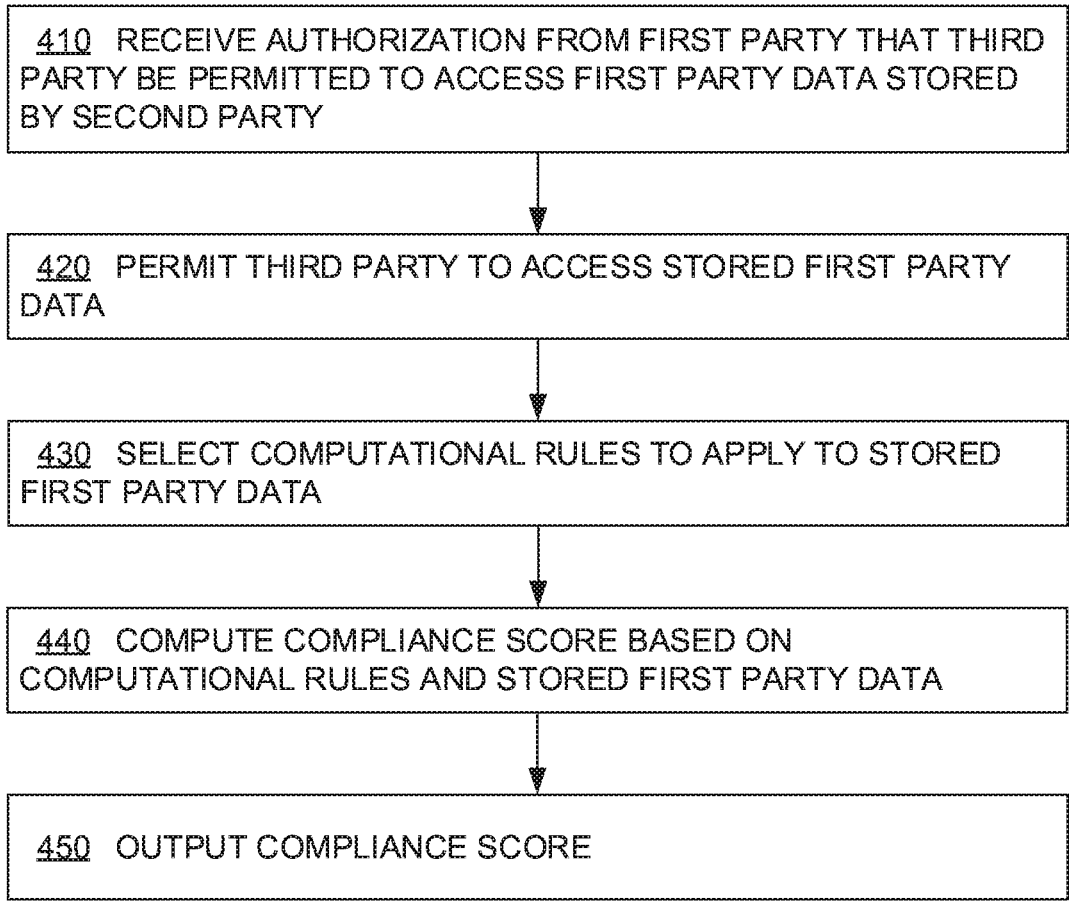
FIG. 4 shows a flow diagram of a computer-implemented method for a service platform, according to embodiments.

FIG. 4 is flow diagram of a computer-implemented method 400 for generating a compliance score with first party data, according to embodiments. The computer-implemented method includes a block 410 to receive authorization from first party that third party is permitted to access first party data stored by second party; a block 420 to permit third party to access stored first party data; a block 430 to select computational rules to apply to stored first party data; a block 440 to compute compliance score based on computational rules and stored first party data; and a block 450 to output compliance score. In some embodiments, at least some of the acts in blocks 410-450 may be performed in a different order than presented, may be combined, may be omitted, or may have additional acts performed therebetween. For example, the block 430 to select computational rules to apply to the stored first party data may be omitted from the computer-implemented method 400.

The block 410 to receive authorization from first party that third party is permitted to access first party data stored by second party may include receiving, by a computer system of a second party (DRP provider), an authorization from a first party that a third party (reviewer) be permitted to access first party data stored by the second party. The first, second, and third party are all distinct from each other. The authorization may be electronic authorization received from a first party computing device. The authorization may include a digital code previously established on behalf of the first party to grant access to the stored first party data.

The block 420 to permit third party to access stored first party data may include permitting, by the computer system and responsive to the authorization, the third party to access the stored first party data. Permitting the third party to access the stored first party data may include allowing the third party computing device to access (view or select) one or more portions of the stored first party data. Permitting the third party to access the stored first party data may include allowing access, by a scoring engine, to one or more portions of the store first party data.

The block 430 to select computational rules to apply to stored first party data may include selecting, by the computer system, computational rules to apply to the stored first party data. Selecting the computational rules may include receiving instructions from one or more of the first party or the third party to use one or more computational rules stored on the computer system. Selecting the computational rules may include receiving, at the computer system, one or more computational rules from one or more of the first party or the third party (e.g., reviewer).

The block 440 to compute compliance score based on computational rules and stored first party data may include computing, by a scoring engine of the computer system, a compliance score based on the computational rules and the stored first party data. The compliance score may include one or more sub-scores each computed from only a portion of the stored first party data. Computing the compliance score may include aggregating a plurality of sub-scores (computed from a plurality of the computational rules) to determine the compliance score. Computing the compliance score may include applying one or more parameter modifiers to one or more of the plurality of sub-scores to weight one or more of a plurality of sub-scores (from a plurality of the computational rules), and aggregating the plurality of sub-scores to determine the compliance score.

Computing the compliance score may include applying one or more of the computational rules to a portion of the stored first party data selected by the first party. The portions of the stored first party data may be selected or specified by one or more of the first party, the computational rules, or the third party.

The block 450 to output compliance score may include outputting the compliance score to one or more of the first party or the third party. The compliance score may be output as one or more sub-scores and the aggregate thereof as the compliance score. Outputting the compliance score may include sending the compliance score to the network address of one or more of the first party or the third party.

The method 400 may include categorizing one or more sub-scores or the compliance score to one or more score bands describing preselected value ranges for the one or more sub-scores or compliance score. For example, one or more of the sub-scores or the compliance score may be categorized into value ranges indicating high compliance, medium compliance, low compliance, low risk, medium risk, high risk, or the like range. In such embodiments, outputting the compliance score includes causing the one or more sub-scores or the compliance score to be presented, by the computer system to a user interface at a first party computing device or a third party computing device, as a member of one or more of the preselected value ranges. For example, the compliance score or the sub-scores may be output as members of a visual range, such as green for high compliance, yellow for medium compliance, or red for low compliance.

The method 400 may include receiving the first party data from one or more of the first party or a service provider (e.g., OSP 130 of FIG. 1 or Tax Assisting Service Platform 740 of FIG. 7 below) storing first party data. The method 400 may include receiving, with the computer system, a request from the third party, by a third party computing device in communication with the computer system, to determine the compliance score based on the stored first party data and the computational rules. The method 400 may include receiving, with the computer system, a request from the first party, by the first party computing device in communication with the computer system, to determine the compliance score based on the stored first party data and the computational rules.

The method 400 may include allowing, by the computer system, the first party to view or apply the computational rules, on a first party computing device in communication with the computer system, such as via a command from the first party computing device. The method 400 may include allowing, by the computer system, the first party to view the compliance score on a first party computing device in communication with the computer system.

The DRP platform provider (second party) may generate and disseminate compliance scores with first party data and computational rules on behalf of the third party utilizing method 400. Third parties, such as the reviewer 110 (FIG. 1), may cause the second party (DRP provider) computer system to generate and output a compliance score using the first party data and computational rules.

Figure 5:
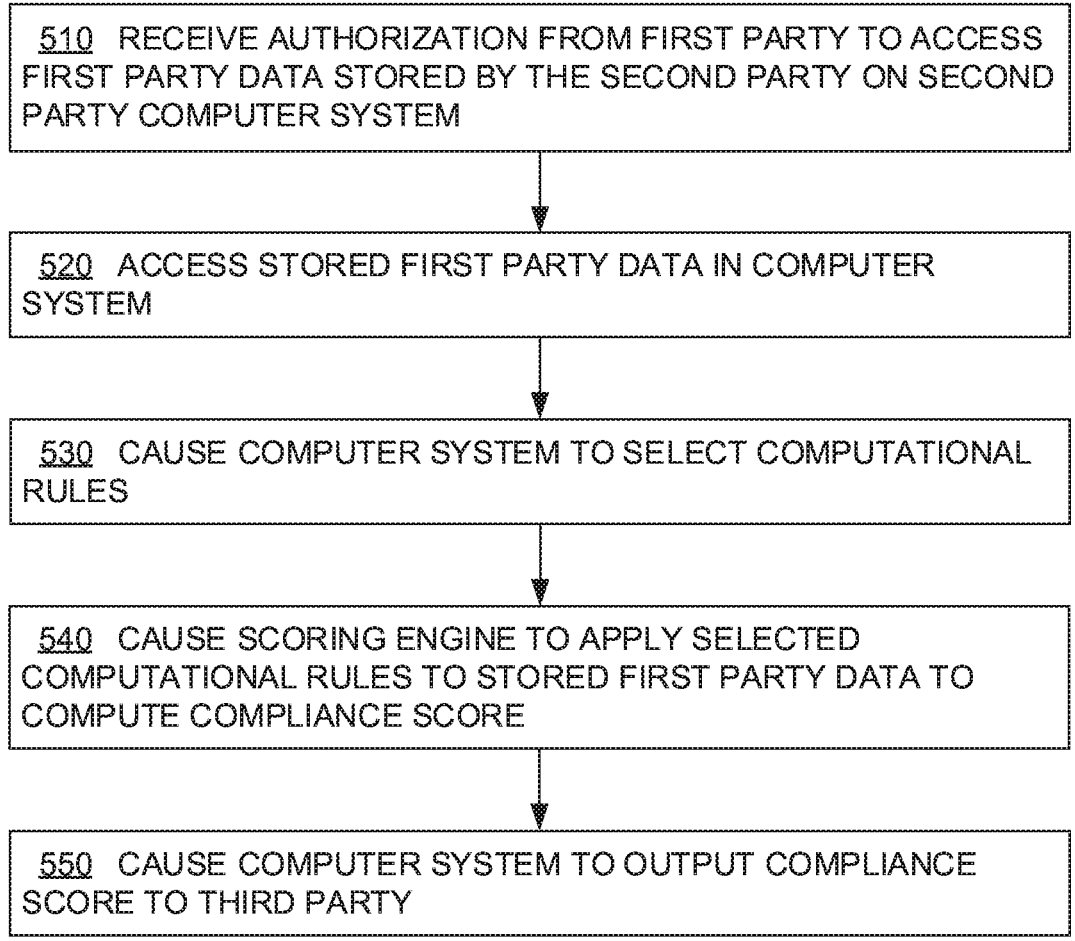
FIG. 5 shows a flow diagram of a computer-implemented method for a reviewer using a service platform, according to embodiments.

FIG. 5 is flow diagram of a computer-implemented method 500 for generating a compliance score with first party data, according to embodiments. The computer-implemented method includes a block 510 to receive authorization from first party to access first party data stored by the second party on second party computer system; a block 520 to access stored first party data in computer system; a block 530 to cause computer system to select computational rules; a block 540 to cause scoring engine to apply selected computational rules to stored first party data to compute compliance score; and a block 550 to cause computer system to output compliance score to third party. In some embodiments, at least some of the acts in blocks 510-550 may be performed in a different order than presented, may be combined, may be omitted, or may have additional acts performed therebetween. For example, the blocks 510 and 520 may be combined in computer-implemented method 500.

The block 510 to receive authorization from first party to access first party data stored by the second party on second party computer system may include receiving, by a third party (reviewer) from a computer system of a second party (DRP provider), an authorization from a first party to access first party data stored by the second party on the computer system. The authorization may be electronic authorization as disclosed herein. The authorization may be received by the third party to access to the first party data. The authorization may be sent and received by the first party to provide access to the first party data. The authorization may be received by the second party (e.g., via the DRP) to provide access to the first party data.

The block 520 to access stored first party data in computer system may include accessing, pursuant to the authorization, the stored first party data in the computer system. For example, the (second party) computer system which provides the DRP may store the first party data and may permit access to the first party data by one or more of the scoring engine or the third party. Accessing the stored first party data may include causing the computer system to present the stored first party data on a user interface generated by the computer system, such as to the third party. Accessing the stored first party data may include identifying, by a third party computing device in communication with the computer system, one or more portions of the stored first party data for generating the compliance score. The authorization may be authorization to permit access to only selected data sets of the first party data.

The block 530 to cause computer system to select computational rules may include causing the computer system to select at least one of a plurality of computational rules. Causing the computer system to select at least one of a plurality of computational rules may include providing, by a third party computing device in communication with the computer system, instructions to select at least one of the plurality of computational rules stored on the computer system, such as via a user interface. For example, causing the computer system to select at least one of a plurality of computational rules may include causing the computer system to present at least some of the plurality of computational rules on a user interface generated by the computer system. Causing the computer system to select at least one of a plurality of computational rules may include providing, to the computer system, one or more computational rules from a third party computing device in communication with the computer system.

Causing the computer system to select at least one of a plurality of computational rules may include selecting, by a third party computing device in communication with the computer system, a plurality of computational rules, at least some of the plurality of computational rules including rules for calculating a plurality of sub-scores based on discrete data of the stored first party data and aggregating the plurality of sub-scores to determine the compliance score. The compliance score may be one or more sub-scores. Causing the computer system to select at least one of a plurality of computational rules may include selecting, by a third party computing device in communication with the computer system, one or more parameter modifiers for weighting one or more of the plurality of sub-scores.

The plurality of computational rules may include machine readable and executable instructions, to be carried out on the computer system, for categorizing one or more of the plurality of sub-scores or the compliance score to one or more score bands describing preselected value ranges for the one or more of the plurality of sub-scores or compliance score, such as described above with respect to the method 400.

The block 540 to cause scoring engine to apply selected computational rules to stored first party data to compute compliance score may include causing a scoring engine of the computer system to apply the selected at least one of a plurality of computational rules to the stored first party data for computing a compliance score. The scoring engine may be the scoring engine of a DRP as disclosed herein. Causing the scoring engine to apply the selected at least one of a plurality of computational rules to the stored first party data for computing a compliance score may include providing a command to the computer system to begin calculating the compliance score, such as by a third party computing device in communication with the computer system. The command may be entered by the third party in a user interface provided by the computing device (e.g., by the DRP stored on the second party computing device).

The stored first party data may include a plurality of discrete data sets. A plurality of computational rules may be used to compute a plurality of sub-scores with the discrete data sets. The compliance score may include the plurality of sub-scores formed with the plurality of discrete data sets and may be a sum of the plurality of sub-scores. In such embodiments, causing the scoring engine to apply the selected at least one of a plurality of computational rules to the stored first party data for computing a compliance score may include causing the scoring engine to apply the selected plurality of computational rules to selected discrete data sets of the stored first party data for computing a plurality of sub-scores to provide the compliance score(s).

The block 550 to cause computer system to output compliance score to third party may include causing the computer system to output the compliance score to the third party by providing a command to output the compliance score to a computing device of the third party. Causing the computer system to output the compliance score may include causing the computer system to present one or more of a plurality of sub-scores or the compliance score to the third party, such as via a user interface generated by the computer system. Causing the computer system to output the compliance score may include causing the computer system to present the compliance score as a member of a value range. For example, the compliance score may be output as a member of a color-coded value range as disclosed herein, such as via a user interface generated by the computer system. One or more of a plurality of sub-scores or the compliance score may be output as a member of one or more of the preselected value ranges on a user interface generated by the computer system.

The method 500 may include receiving, at a third party computing device, a request for a benefit from the first party based on the compliance score. The method 500 may include requesting, by a third party computing device in communication with the computer system, a compliance score for the first party.

Figure 6:
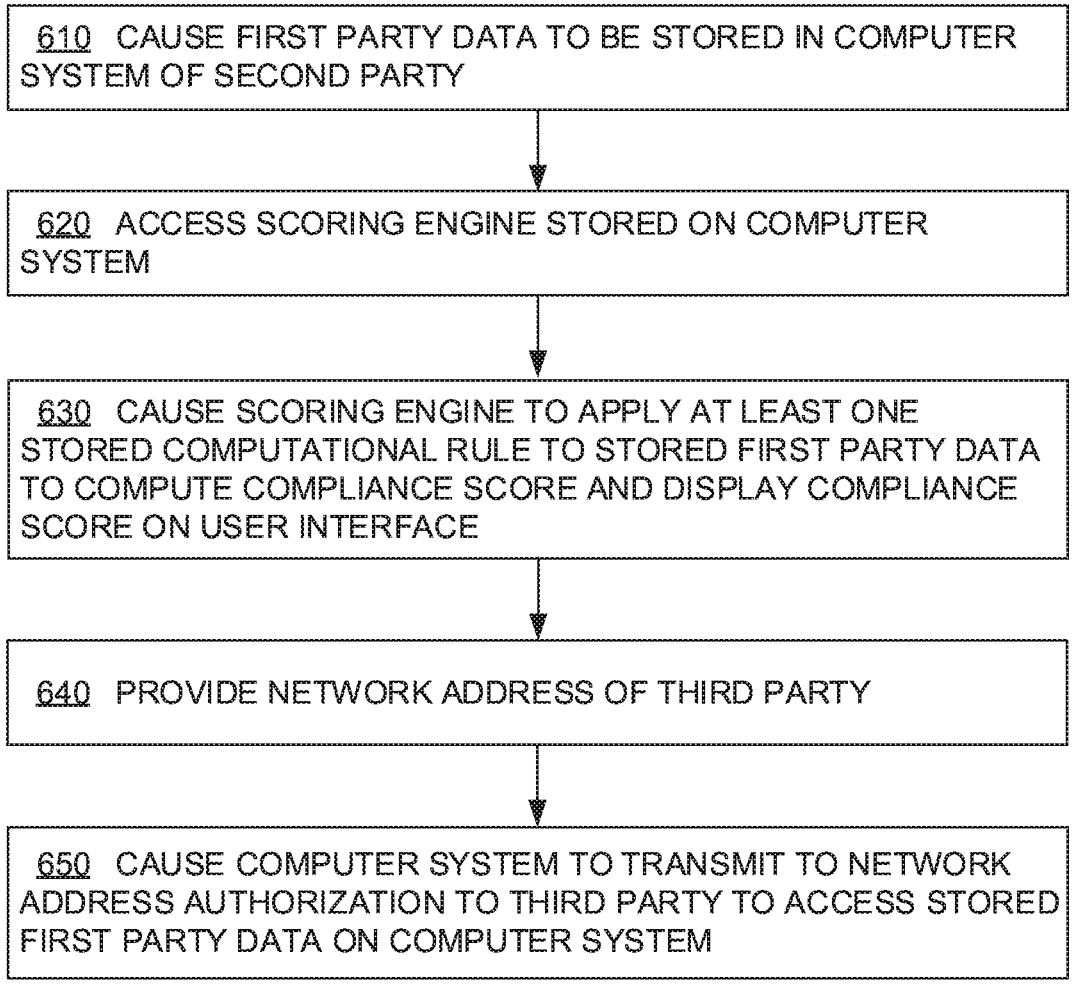
FIG. 6 shows a flow diagram of a computer-implemented method for a first party using a service platform, according to embodiments.

FIG. 6 is flow diagram of a computer-implemented method 600 for generating a compliance score with first party data, according to embodiments. The computer-implemented method includes a block 610 to cause first party data to be stored in computer system of second party; a block 620 to access scoring engine stored on computer system; a block 630 to cause scoring engine to apply at least one stored computational rule to stored first party data to compute compliance score and display compliance score on user interface; a block 640 to provide network address of third party; and a block 650 to cause computer system to transmit to network address authorization to third party to access stored first party data on computer system. In some embodiments, at least some of the acts in blocks 610-650 may be performed in a different order than presented, may be combined, may be omitted, or may have additional acts performed therebetween. For example, the block 610 to cause first party data to be stored in computer system of second party may be omitted from the computer-implemented method 600.

The block 610 to cause first party data to be stored in computer system of second party includes causing, by a first party computing device, first party data to be stored in a computer system of a second party (DRP provider) in communication with the first party computing device. Causing the first party data to be stored in the computer system of the second party may include inputting at least some of the first party data into the computer system. Inputting at least some of the first party data into the computer system may include inputting the first party data from remote computing device such as from the first party computing device or a remote service platform (e.g., OSP 130 of FIG. 1). The first party may input the first party data or direct the input of the first party data.

The block 620 to access scoring engine stored on computer system includes accessing, by a user interface of the computer system, a scoring engine stored on the computer system. Accessing the scoring engine may include selecting at least one computational rule for the scoring engine to apply to the first party data to compute the compliance store. For example, accessing the scoring engine may include selecting the at least one stored computational rule from a plurality of computational rules for the scoring engine to apply for computing the compliance store. At least some of the plurality of computational rules are stored in the computer system. In such embodiments, the plurality of computational rules may be identified (e.g., selected or provided to the computer system) by the first party or the third party.

Accessing the scoring engine may include selecting a plurality of computational rules, at least some of the plurality of computational rules including rules for calculating a plurality of sub-scores based on discrete data of the stored first party data and aggregating the plurality of sub-scores to determine the compliance score. The compliance score may be one or more sub-scores computed from only a portion of the stored first party data or may be the sum of the sub-scores.

The plurality of computational rules may include parameter modifiers for weighting one or more of the plurality of sub-scores as disclosed herein. Selecting the at least one stored computational rule from a plurality of computational rules includes selecting one or more parameter modifiers to apply to one or more of the plurality of sub-scores. The plurality of computational rules includes machine readable and executable instructions, to be carried out on the computer system, for categorizing one or more of the plurality of sub-scores or the compliance score to one or more score bands describing preselected value ranges for the one or more of the plurality of sub-scores or compliance score as disclosed herein.

The block 630 to cause scoring engine to apply at least one stored computational rule to stored first party data to compute compliance score and display compliance score on user interface includes causing, by the user interface, the scoring engine to apply at least one stored computational rule to the stored first party data to compute a compliance score and display the compliance score on the user interface. Causing the scoring engine to apply at least one stored computational rule to the stored first party data to compute a compliance score may include entering an execute or start command into a user interface displayed on the first party computing device. Causing the scoring engine to apply at least one stored computational rule to the stored first party data to compute a compliance score includes selecting one or more discrete data sets of the stored first party data for applying the scoring engine upon.

The block 640 to provide network address of third party includes providing, by the user interface, a network address of a third party. Providing the network address of a third party may further include providing an identification of the third party to the computer system, such as indicating a third party network address or identification code to the computer system. For example, the first party may identify the reviewer to the second party computer system by providing the network address of the reviewer. Such identification may be provided with the authorization for the third party to access the first party data on the computer system (of the second party).

The block 650 to cause computer system to transmit to network address authorization to third party to access stored first party data on computer system includes causing, by the user interface, the computer system to transmit to the network address an authorization to the third party to access the stored first party data on the computer system. For example, the first party may input, into a user interface generated by the second party computer system (e.g., DRP), a command or authorization to the second party computer system to transmit the network address authorization to the third party to view the first party data. In such contexts, the first party data may include the compliance score(s). For example, the second party computer system my save the compliance scores with the first party data used to compute the compliance score, such as in a first party database stored in the second party computer system. Causing the computer system to transmit to the network address an authorization to the third party to access the stored first party data on the computer system may include authorizing (or providing a command to) the second party to output the compliance score to the third party. For example, causing the computer system to transmit to the network address an authorization to the third party to access the stored first party data on the computer system may include entering an output command into the user interface. Causing the computer system to transmit to the network address an authorization to the third party to access the stored first party data on the computer system may include outputting the compliance score to the network address.

Causing the computer system to transmit to the network address an authorization to the third party to access the stored first party data on the computer system may include causing the computer system to present one or more of a plurality of sub-scores or the compliance score as a member of one or more of the preselected value ranges on a user interface generated by the computer system. The preselected value ranges may be presented as color-coded ranges, numerical ranges, or the like as disclosed herein.

While methods 400, 500, and 600 are described above from the prospective of a single party (e.g., the second party DRP provider, the third party reviewer, or the first party, respectively), in some examples, more than one of the parties actions may be required to accomplish generating a compliance score on the DRP with the first party data for the third party to review. For example, responsive to a request for a benefit from the first party (e.g., loan, enrollment, etc.), the third party may request a compliance score from the second party based on first party data stored by the second party. Responsive to the request, the first party may authorize the second party to grant access to the third party to review the first party data stored on the second party DRP. Responsive to receiving access the third party may initiate the scoring engine to execute computational rules using the first party data to determine the compliance score.

One or more of the compliance scores or the first party data may be provided from a tax-assisting service platform. For example, the tax-assisting service platform may store first party tax, account, and address data, which may be provided to the DRP 140 (of FIG. 1). The tax-assisting service platform may include or generate the DRP 140 to produce compliance scores using the first party data therein, each of which may be available to the third party.

The methods, systems, devices, and computer readable and executable programs for generating and obtaining compliance scores with data from brick-and-mortar or e-commerce environments disclosed herein may be used by credit underwriters, banking institutions, or businesses to determine if a first party qualifies for a specific categorization or benefit.

Credit underwriters lend to companies based on a company's management, financial statements, collateral, personal credit, and industry trends. A common large dollar line item that appears on a company's financial statements is tax liabilities. Credit underwriters take a company's financial health into account, and lending credit to a company with inaccurate tax liabilities is high risk. A compliance (e.g., risk) score is a resource that credit underwriters can use to ensure they are lending credit to companies who calculate and remit taxes accurately. The compliance scores may indicate the first party's satisfaction of, or a level or satisfaction of, one or more criteria required to qualify for a benefit offered by a third party, such as the credit underwriters (e.g., the reviewer 110).

The compliance score may be calculated with computational rules as executed by the scoring engine. The computational rules may be used to demonstrate the first party's compliance (e.g., risk) with one or more specific criteria encoded therein, as demonstrated by the first party data. For example, the criteria may include the time in business, such as the number of months selling. Such criteria help establish business history and may be measured in years, months, weeks, or days since an initial invoice.

Criteria that may be used to determine the tax compliance health score are discussed in more detail below. For example, the criteria may be encoded as compliance rules within machine readable and executable instructions for assigning a compliance score to the first party based on one or more of an age of a first party account, a number of open invoices beyond a selected duration that belong to the first party, a statistic reflecting an accuracy of invoices belonging to the first party, a statistic reflecting a length of time that the first party has remitted a mandated usury, an amount of time the first party has with a delinquent usury, a statistic reflecting a validity of mailing addresses of other parties in transactions with the first party, a perceived likelihood of investigation of the first party by a regulatory entity, or a presence of adverse public records corresponding to the first party. These can be used individually, each with scores, and bands for ranges of scores. Or, an aggregate score may be computed as described later in this document.

The number of unpaid invoices beyond a selected time period may be used as a criterion in the computational rules. For example, the number or percentage invoices that are unpaid for longer than six months old may inform the third party about the health of the first party's accounts.

Accuracy of invoices for purposes of tax computation may be used as a criterion in the computational rules. This accuracy may include the accuracy of the customer addresses in the invoices. An address pull may be provided by the DRP 140 or the OSP 130 (FIG. 1). Accuracy of invoices is a primary factor for the credit score. If a company has an issue with its invoices billing or shipping to or from inaccurate addresses, it can cause the wrong tax liability to populate in a tax determination engine; therefore, the company is likely not compliant with its tax obligations. More errors indicate a larger issue.

Figure 7:
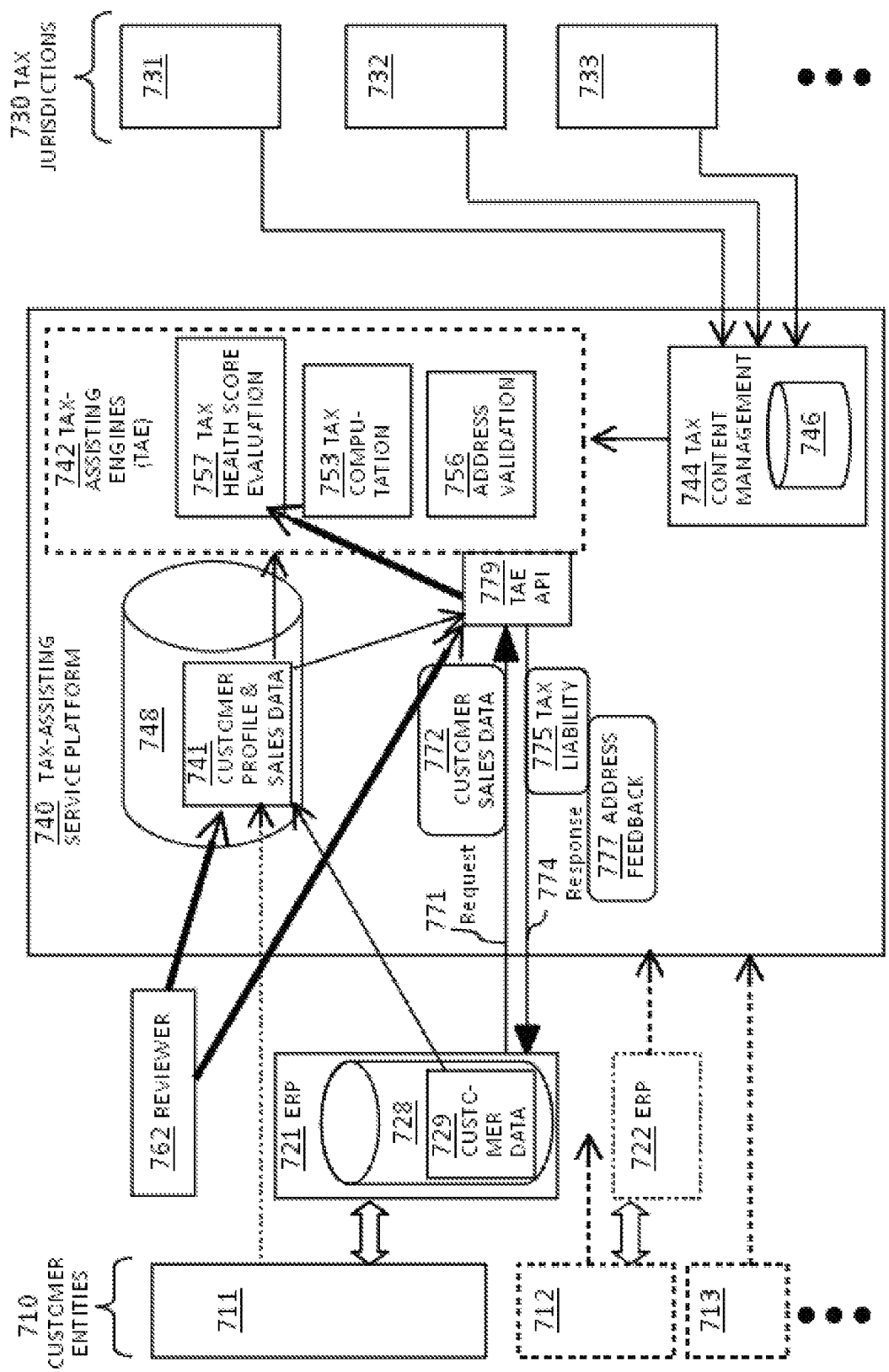
FIG. 7 shows a sample software configuration, according to embodiments.

Invoices can be checked for tax transaction addresses, for example using address validation 756 disclosed below (FIG. 7). These determine the jurisdiction, and therefore the applicable tax rate. Invoices can also be checked for Tax Transaction Product Code, for example using tax content management 744 below (FIG. 7), and therefore the applicable tax rate.

The computation and score for the accuracy of invoices can be the percent of inaccurate invoices over the whole, such as 5 out of 100 invoices during a period had errors, so they had a 5% invoice error rate for the period. The percentage can be determined per time period. A monthly time period may be better to keep consistent with current standard credit reporting practices, while quarterly gives a larger sized data pool for the overall percentage.

Sample ranges of compliance or risk may include a high risk for 65.01-100% invoice error rate, a medium risk for 35.01-65% invoice error rate, a low risk for 0-35% invoice error rate. The risks ranges may be displayed in color-coded ranges, with green for low risk, yellow for medium risk, red for high risk. The risk ranges may conversely correspond to compliance ranges, such as low compliance equating to high invoice error rates, medium compliance equating to medium invoice error rates, and high compliance equating to low invoice error rates.

The length of time remitting taxes may be a criterion in the computational rules. The longer history a company has in collecting and remitting taxes provides for a better picture of tax compliance behavior. The length of time (e.g., counted as number of months, weeks, etc.) may account for younger companies.

In banking, most companies cannot receive financing until they can show 3 years of financial information. Accordingly, a length of time in remitting taxes of 36 months or more may be associated with a low risk and displayed as green. A length of time in remitting taxes of 13-35 months may be associated with a medium risk and displayed as yellow. A length of time in remitting taxes of 0-12 months may be associated with a high risk and displayed as red.

The lateness in tax remittance may be a criterion in the computational rules. Lateness in tax remittance can be a primary factor for the credit score. A company who remits timely is more likely to not misuse any tax funds received by its customers.

The computational rules for lateness in tax remittance can be performed in a number of ways. For example, at the first party data and reference data from a tax assistance platform may be used to determine when tax remittance is due and if all liabilities have been met. Such tax assistance platforms may indicate whether a customer has sufficiently funded their liabilities. Not funding the liabilities on time results in the filing (remittance) being delayed.

This factor could be a percentage of how many months there is a lateness, divided by the whole number of months. For example, if a company pays the tax assistance platform to handle 50 U.S. returns for filing and they don't have enough to fund 10 in a given month or quarter, they would get marked down for having not filed or filed a late return regardless of how many returns were late. Having multiple late months increases the mark downs of the overall compliance score. Or, this factor could be a percentage of how many of the individual filings that the tax assistance platform handles were late over the whole.

The computational rule could utilize a selected duration (e.g., number of years) of historical data to determine a percentage. For example, in the past 36 months, 2 months reflected late payments, so they have a 5% rate of late remittance history. Possible ranges for non-compliance or risk may be 0-5% for low risk, 5.01-10% medium risk, and greater than 10% is a high risk.

Likelihood of receiving a tax audit per industry, whether a particular industry or company is more likely to be audited, may be used in the computational rules. For example, a categorization of the first party's industry may be provided in the first party data. The computational rules may reference statistical data to calculate the likelihood of the first party receiving an audit. This can be performed by a number of ways. For example, as a tax assistance service platform receives audit notices per industry (e.g., customers let the platform know when they are being audited so the platform can assist), the platform would be able to determine whether a particular industry is more likely to be audited. A compliance score (e.g., sub-score) may be calculated based on the complexity of the industry of the first party, such as higher scores for more complex industries, such as beverage-alcohol, hospitality, and fuel industries.

Likelihood of being subjected to a tax audit per jurisdiction may be used in a computational rule, such as whether one jurisdiction is more likely to audit a particular industry or company remitting a certain dollar threshold. Examination of this computational rule can be performed by a number of ways. For example, as a tax assistance service platform receives audit notices from jurisdictions (e.g., as customers are letting the platform know when they are being audited so the platform can assist), the platform would be able to determine whether a specific jurisdiction is more likely to audit. Utilizing the platform's aggregate data (across all clients or industries), the platform can determine if one industry is more likely to be susceptible to inaccurate tax compliance due to issues such as complicated tax laws. The computational rules may assign compliance scores for likelihood of audit, such as per jurisdiction. For example, a higher score may be provided for Brazil, because Brazil has very complex tax laws so could create a riskier industry score.

Adverse public records such as tax liens, bankruptcy, and judgments may be used in the computational rules. For example, a computational rule may examine the first party data or reference data from a third source to determine if the first party is subject to liens, filed for bankruptcy protection, or has any judgments against it. The computational rule may be applied to a selected time period such as the last 1 year, the last 3 years, the last 5 years, the last 7 years, or the like. Companies who have received tax liens would negatively affect the score. Accordingly, if no liens are present in the time period the first party may receive a perfect numerical score, which may be displayed in green for low risk/high compliance. If liens are present, the numerical score (e.g., sub-score) may be negatively affected, which may be displayed as red for high risk/low compliance.

Other criteria may be utilized in the computational rules. Any of ranges, sub-scores, or compliance scores disclosed herein can be categorized and displayed in a visual range, such as a color-coded range.

The compliance score could have many ranges, such as 0 to 10, 0 to 100, etc. Or, the compliance score could range from 0 to an indefinite number depending on the percentile weighting of each criterion and the data available to the data source.

The business would determine whether the score should be aligned with that of other reporting agencies in the event of potential partnerships.

FIG. 7 shows a sample software configuration according to embodiments. FIG. 7 shows a software architecture working with a reviewer 762, according to embodiments. In this example, a software-implemented tax-assisting service platform 740 is configured to provide tax-related services. These services include performing tax calculations and address validation for customer entities 710. Further, the soft-ware implemented tax-assisting service platform may provide tax health score calculations. Any one of sample customer entities 711, 712, 713, includes a computer, which is sometimes called a client computer. A user of customer entities 711, 712, 713 may use the computer. Both the user and client computer could be located within a physical site of the customer entity entities 711, 712, 713, but that is not necessary. These customer entities 710 may access a software-implemented tax-assisting service platform 740, for receiving its tax-related services. These customer entities 710 may be either sellers or buyers of goods and/or services. The tax-assisting platform 740 may be the OSP 130 (FIG. 1).

Aspects of FIG. 7 may be implemented by components described and shown elsewhere in this document, for example with reference to FIG. 1. For instance, in some embodiments, customer entities 710 access tax-assisting service platform 740 fully directly, for example as is shown for customer entity 713. In other embodiments, this accessing is performed at least in part indirectly, for example by using Enterprise Resource Planning (ERP) systems 721, 722. In this example, ERP system 721 has a database 728 that stores customer data 729 of customer entity 711, such as sales data. In this example, tax-assisting service platform 740 includes a database 748. Customer profile 741 of customer entity 711 may be stored in database 748, either directly by customer entity 711, or indirectly by ERP 721 transferring customer data 729, or a combination of both, etc.

Tax-assisting service platform 740 includes a tax content management component 744 for use by TAE 742. Tax content management component 744 may receive tax information from one or more tax jurisdictions 730, such as sample tax jurisdictions 731, 732, and 733. Tax content management component 744 includes a database 746 for storing the received tax information in the form of tax rules, rates, exemptions, etc.

In addition, tax-assisting service platform 740 includes tax-assisting engines (TAE) 742. TAE 742 include a tax computation engine 753, a tax health score evaluation engine 757, and even an address validation engine 756.

In this example, tax-assisting engines 742 may be invoked via a TAE Application Programming Interface (API) 779. Only one TAE API 779 is shown implemented here, while multiple ones may be implemented instead, for example one for invoking each of tax computation engine 753, tax health score evaluation engine 757, and address validation engine 756. In this example, TAE API 779 is configured to receive a request 771 from ERP 721. Request 771 has data 772 of customer entity 711. Data 772 may be looked up from customer data 729 in database 728. In response to receiving request 771 with its data 772, TAE API 779 invokes one of tax-assisting engines 742 to perform its service. Then, TAE API 779 is configured to transmit a response 774. Response 774 can be transmitted back to the sender of request 771, or otherwise.

If tax computation engine 753 is thus invoked by request 771, it may calculate a tax liability of an amount of tax due, based on data 772. In that case, response 774 includes a component of a tax liability 775 that indicates the calculated amount.

If address validation engine 756 is thus invoked by request 771, it may perform an address-validation process, based on data 772. In that case, response 774 includes a component of an address feedback 777. The latter can be a message that an address is valid, or not, or propose a different address.

In some embodiments, tax-assisting service platform 740 may perform a variety of services in addition to what is described above. For one example, tax-assisting service platform 740 may accumulate and store customer sales data 772.

In another example, tax-assisting engines 742 may further include one or more additional engines and/or functional components than are shown in the example of FIG. 7. Such additional engines and/or functional components, upon being invoked, can perform additional tax-related services, such as: a) register one or more of customers 710 with one or more appropriate tax jurisdictions 730, b) generate tax returns, i.e. prepare forms for filing by customer entities 710, c) file electronically such returns with the appropriate ones of tax jurisdiction(s) 730, and so on.

The reviewer 762 may be similar or identical to the reviewer 110 of FIG. 1 in one or more aspects. For example, the reviewer 762 is a third party separate and distinct from the tax-assisting service platform 740 and the customer entities 711, 712, and 713. The reviewer 762 may access the database 748 and the TAE API 779 to review customer entity data stored thereon or accessible thereby. For example, the reviewer 762 may access the TAE API 779 to access (e.g., view) the tax health score evaluation 757 in the tax assisting engine. The tax health score evaluation engine 757 may be invoked by the reviewer 762. Such access may only be permitted to the reviewer 762 upon authorization of the customer entities 711, 712, or 713 (e.g., first parties) as disclosed herein.

At least some of the first party data, the sub-scores, the compliance scores or the like may be presented to the third party by the authorization of the first party, via user interfaces.

Figure 8:
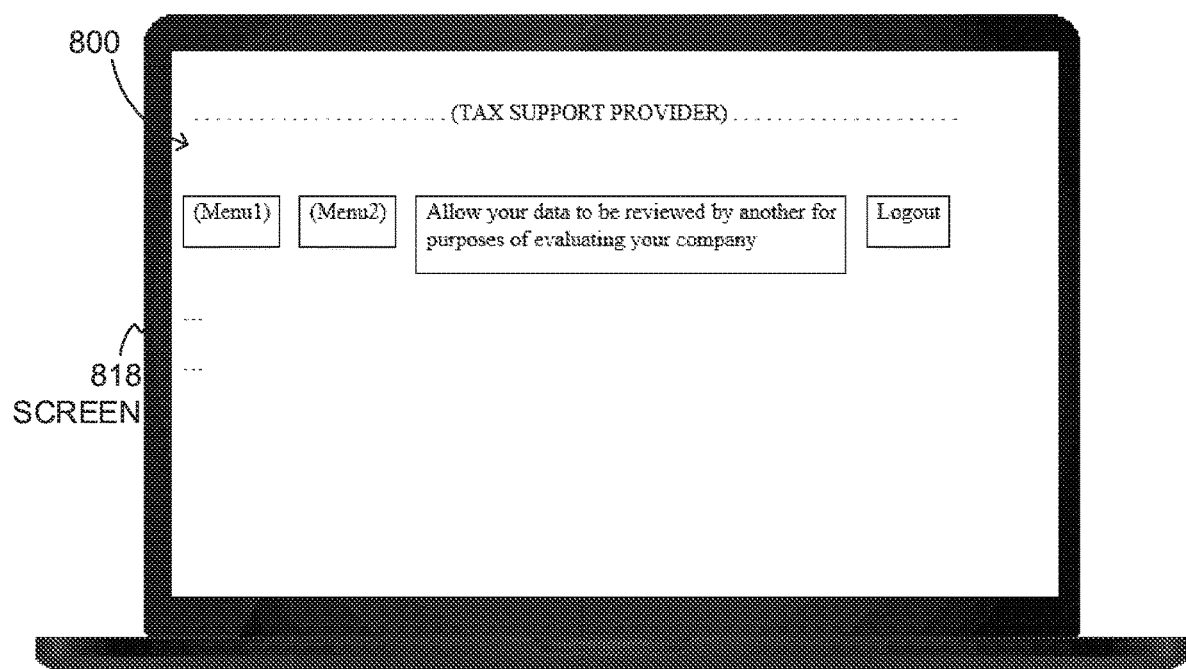
Figure 9:
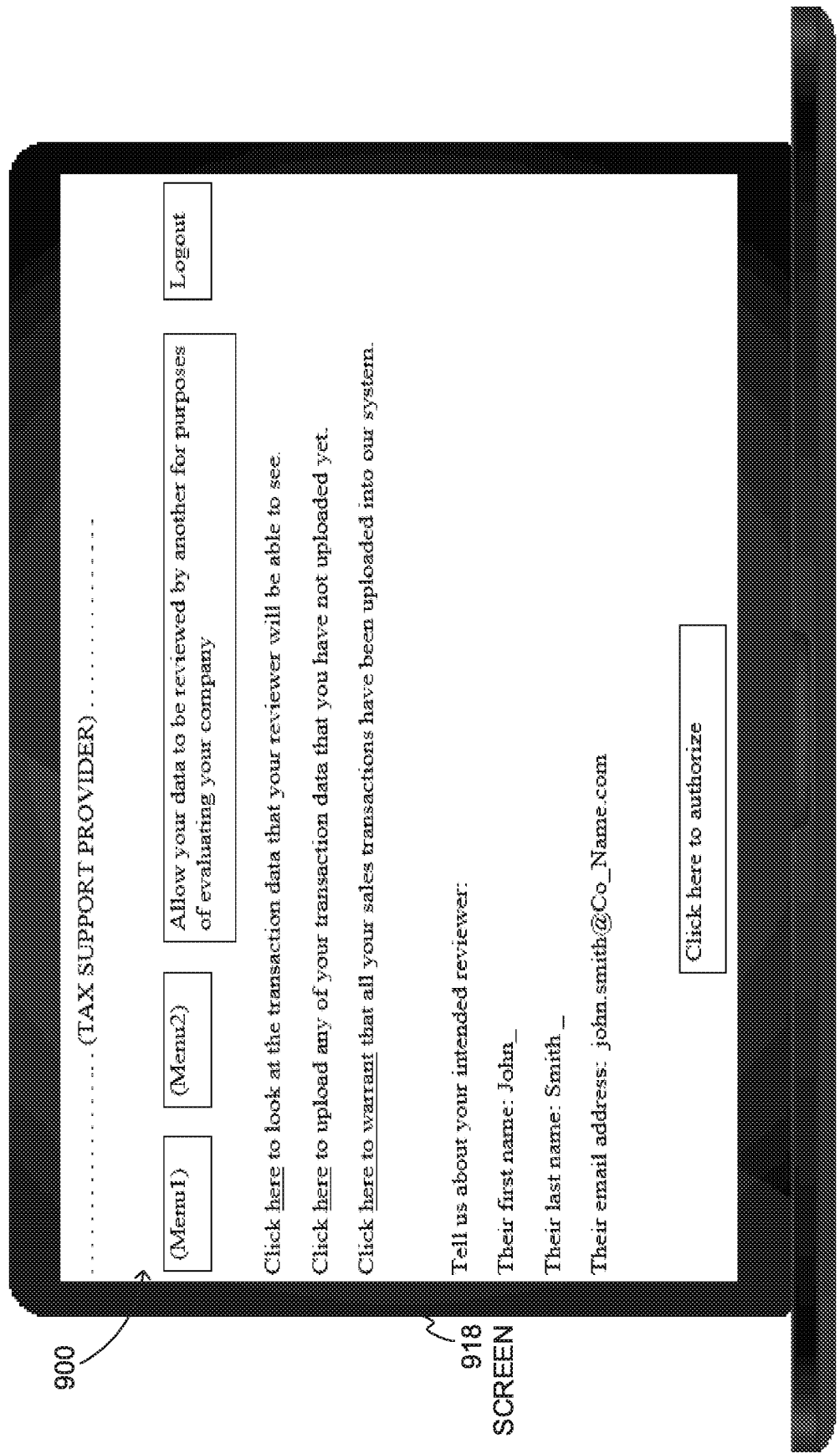

FIG. 8 is a tax support provider's user interface 800 for its customer, according to an embodiment. The tax support provider may be the tax-assisting service platform 740 above or the DRP 140. The user interface 800 may be displayed on the screen 818 of a computing device of the first party (e.g., client of the tax assistance service platform), such as a desk-top or lap-top computer as shown. The user interface 800 may be the user interface 145 as displayed on the computer 124 (FIG. 1). The user interface 800 includes a selection to "allow your data to be reviewed by another for purposes of evaluation your company." The selection may be presented as a button for clicking by the user of the first party. The user interface 800 may include a log-out option. The user interface 800 includes a plurality of menus, such as menu 1 and menu 2. Responsive to selecting the "allow your data . . . " option, the user interface 800 may progress FIG. 9 is tax support provider's user interface 900 for its customer, according to an embodiment. The user interface 900 includes the fields of the user interface 800. The user interface 900 includes an option to view the transaction data that the reviewer (third party) will be able to see responsive to the first party's authorization. The user interface 900 includes an option to upload any transaction data that the first party has not uploaded to the tax support provider's platform. The user interface 900 includes an option to warrant that all of the first party's sales data has been uploaded to the tax support providers platform. Such warrant ensures that the first party has included the most up to date data for any compliance report that is generated therefrom.

The user interface 900 includes an option to tell the tax support provider about the intended reviewer. For example, fields may be presented to provide the first name, last name, and e-mail address of the reviewer. Additionally, or alternatively, the user interface 900 may present a field for providing the network address of the reviewer (e.g., third party) on the screen 918.

The user interface 900 includes an option (e.g., button) to authorize the third party reviewer to access the first party data on the tax support provider's platform, such as the transaction data. Responsive to authorizing the tax support provider to allow the third party to access the first party's data thereon, the tax support provider's platform (e.g., DRP 140 or the tax-assisting service platform 740) outputs said authorization to the reviewer, such as via e-mail.

Figure 10:
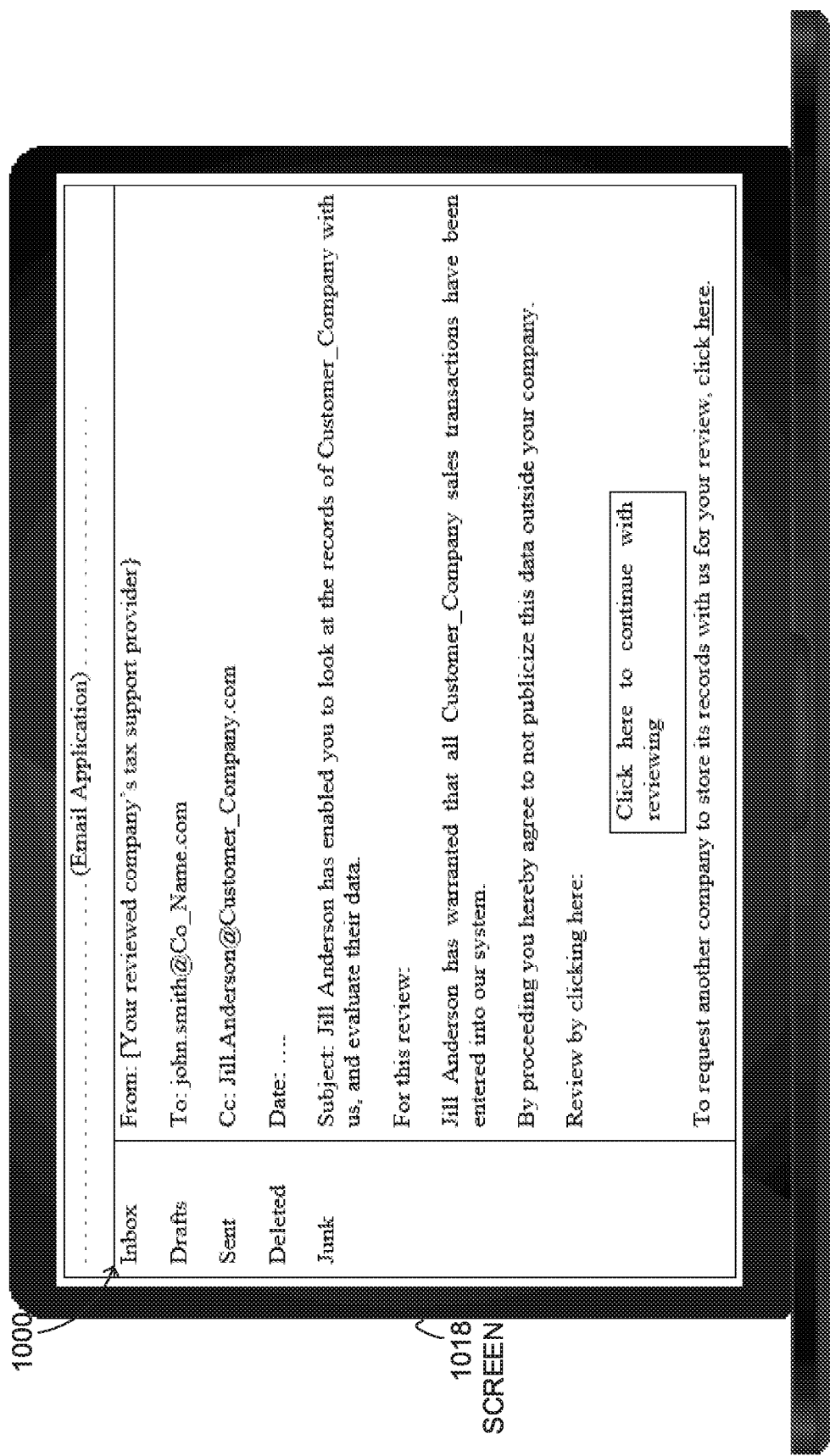

FIG. 10 is a tax support provider's user interface 1000 for a reviewer, according to an embodiment. The user interface 1000 may include an e-mail or other electronic communication form for notifying the reviewer that the first party has authorized the reviewer to access the first party data on the tax support provider's platform. For example, the user interface 1000 may be presented through an e-mail application displayed on the screen 1018.

The user interface 1000 may be presented from the tax support provider on behalf of the reviewed company (e.g., first party). For example, the user interface 1000 may be the user interface 146 displayed on the computer 114 (FIG. 1). The e-mail in the user interface 1000 may be sent to the e-mail address that was entered into the fields in user interface 900. The user interface 1000 may be carbon copied to a representative of the first party, such as the representative that authorizes the reviewer to view the first party data. The user interface 1000 may include a form letter for informing the reviewer that the first party has authorized them view first party data on the tax support provider's platform. The user interface 1000 may also list any warrants that the first party makes, such as that the first party sales transaction data is up to date on the tax support provider platform. The user interface 1000 may include an indication that by proceeding the reviewer hereby agrees to not publicize the first party data outside the reviewer's company. The user interface 1000 includes a link indicating to click here to review the first party data.

The user interface 1000 may include another link to request another company to store its records on the tax support provider's platform for another review, such as by a "click here" link. Responsive to clicking the link to review the first party data, the user interface 1000 may be directed to a webpage or the like displaying the first party data. In such examples, the first party data may include a list of sub-scores and the total compliance score (e.g., risk score).

Figure 12:
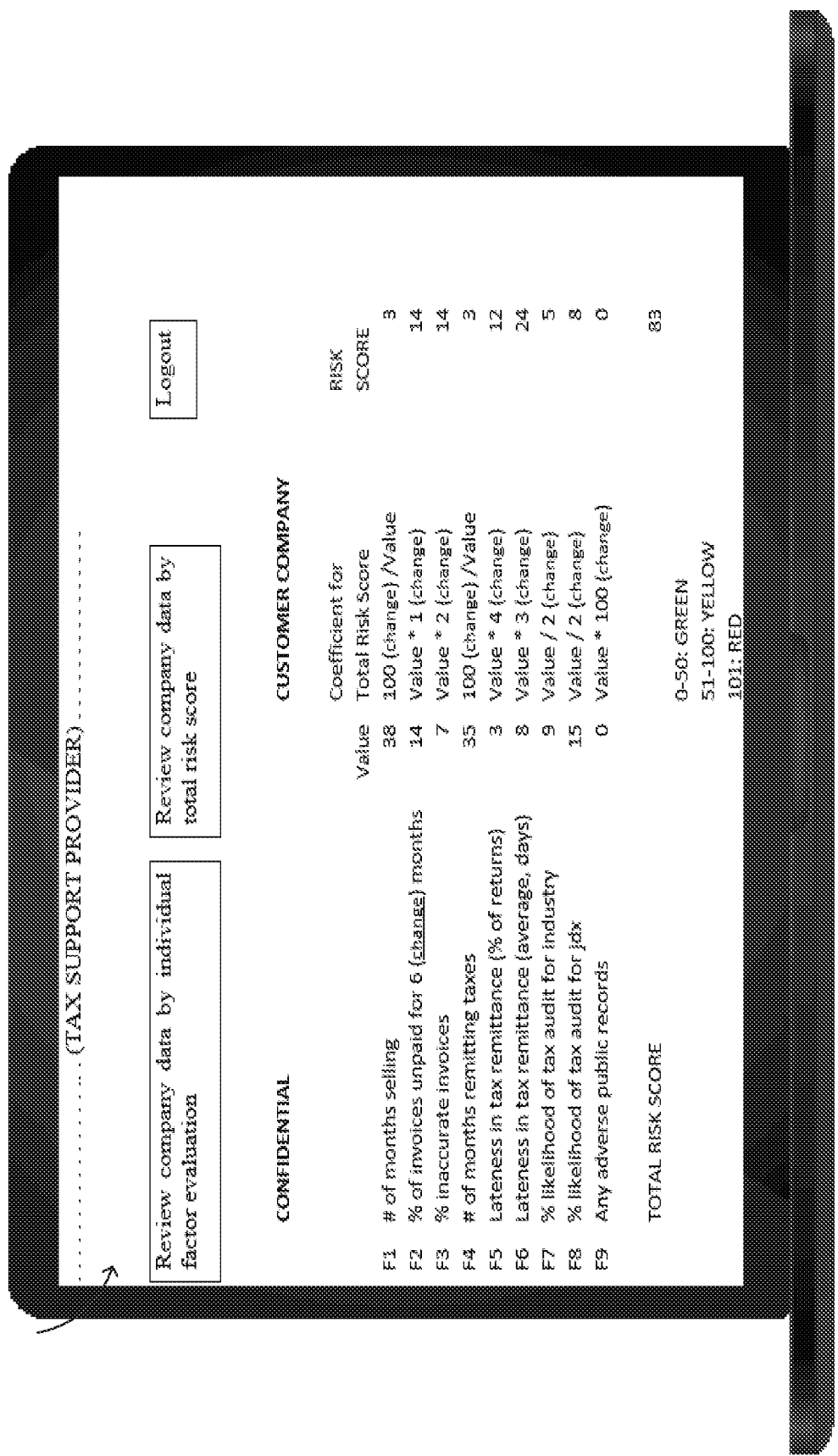

FIG. 11 is a tax support provider's user interface 1100 for its customer, according to an embodiment, shown on screen 1118. The user interface 1100 may be presented to one or more of the first party or the reviewer. The user interface 1100 may include an option to review company data by individual factor evaluation. Upon selecting this option, the user interface displays a plurality of field numbers F1-Fn, each listing the criteria upon which a sub-score was based (e.g., the criteria upon which the computational rules were based), a value corresponding to each field number, an individual evaluation providing detail of the category of values that the corresponding value fits within, such as with a visual presentation like color coding. The values and individual evaluations may be used to form sub-scores as shown in FIG. 12. Additionally, the individual evaluations may list the value ranges for which certain categories, such as low, medium, or high risk; or high, medium, or low compliance are decided. Such ranges may be edited via a corresponding "change" option.

As shown, the first field F1 may list the number of months selling as the criterion, a value of 38, and a green presentation to indicate a low risk. The second field F2 may list the percentage of invoices unpaid for 6 months, with a value of 14, and an individual evaluation of yellow to indicate a medium risk. The third field F3 lists the percentage of inaccurate invoices and lists the value as 7, which corresponds to a low risk indicated by green. The fourth field F4 may list the number of months remitting taxes as the criterion, a value of 35, and a green presentation to indicate a low risk. The fifth field F5 may list the percentage of late tax remittance, with a value of 3, and an individual evaluation of yellow to indicate a medium risk. The sixth field F6 may list the lateness of tax remittance in days, with a value of 8, and an individual evaluation of yellow to indicate a medium risk. The seventh field F7 lists the percentage of likelihood of tax audit for industry and lists the value as 9, which corresponds to a low risk indicated by green. The eighth field F8 lists the percentage of likelihood of tax audit for jurisdiction and lists the value as 15, which corresponds to a medium risk indicated by yellow. The ninth field F9 lists the number of adverse proceedings against the first party and lists the value as 0, which corresponds to a low risk indicated by green.

Each of the ranges in the individual evaluations may be editable by selecting a "change" option, such as by the third party to re-categorize the sub-scores by changing the individual ranges.

The user interface 1100 may include an option to review company data by a total risk score (e.g., total compliance score).

FIG. 12 is a tax support provider's user interface 1200 for its customer, according to an embodiment, shown on a screen 1218. The user interface 1200 may include the same fields as described above with respect to user interface 1100. The user interface 1200 may display the coefficient (e.g., parameter value) for the total risk score applied to each value. The user interface 1200 may display the risk scores (e.g., compliance scores) for each field as a sub-score and a sum of the sub-scores as a total risk score (e.g., total compliance score). The user interface 1200 may display the total risk score as a member of a range of values, such as 0-50 for low risk or high compliance shown as green, 51-100 for medium risk/compliance shown as yellow, and greater than 100 for high risk or low compliance shown as red.

The coefficients may selectively weight each sub-score. Each coefficient may be changed by selecting a prompt to change the coefficient, such as to change the weights of one or more of the sub-scores and the total compliance score.

The user interfaces 800-1200 may be used by the first party (e.g., customer of tax-assisting service platform) and the third party (e.g., reviewer) to initiate, authorize, carry out, and review the results of the generation of compliance scores on a second party platform (e.g., DRP 140 or tax-assisting service platform 740) using first party data stored thereon, for a third party to review.

The configurations disclosed herein provide a safe, secure, private way to review a first party's compliance with one or more criteria for receiving a benefit from a third party, using first party data and computational rules on a second party computer system.

What is claimed is:

1. A computer implemented method, comprising:
  receiving, by a computer system of a second party, an authorization from a first party that a third party be permitted to access first party data stored by the second party, the first, second and third party all distinct from each other;
  permitting, by the computer system and responsive to the authorization, the third party to access the stored first party data;
  selecting, by the computer system, computational rules to apply to the stored first party data;
  computing, by a scoring engine of the computer system, a compliance score based on the computational rules and the stored first party data, in which computing the compliance score includes:
    aggregating a plurality of sub-scores from a plurality of the computational rules to determine the compliance score; and
    includes applying one or more parameter modifiers to one or more of the plurality of sub-scores to weight one or more of a plurality of sub-scores from a plurality of the computational rules, and aggregating the plurality of sub-scores to determine the compliance score; and
  outputting the compliance score.

2. The computer implemented method of claim 1, in which the authorization includes a digital code previously established on behalf of the first party to grant access to the stored first party data.

3. The computer implemented method of claim 1, in which selecting, by the computer system, computational rules to apply to the stored first party data includes receiving, at the computer system, one or more computational rules from the third party.

4. The computer implemented method of claim 1, in which selecting, by the computer system, computational rules to apply to the stored first party data includes receiving instructions from the third party to use one or more computational rules stored on the computer system.

5. The computer implemented method of claim 1, in which selecting, by the computer system, computational rules to apply to the stored first party data includes receiving instructions from the first party to use one or more computational rules stored on the computer system.

6. The computer implemented method of claim 1, in which computing the compliance score includes applying one or more of the computational rules to a portion of the stored first party data selected by the first party.

7. The computer implemented method of claim 1, in which the compliance score is a sub-score computed from only a portion of the stored first party data.

8. The computer implemented method of claim 1, in which the compliance score is output to the first party.

9. The computer implemented method of claim 1, in which the compliance score is output to the third party.

10. The computer implemented method of claim 1, in which outputting the compliance score includes outputting one or more sub-scores corresponding to discrete computational rules to one or more of the first party or the third party, in which the one or more sub-scores aggregate to form the compliance score.

11. The method of claim 10, further comprising:
  categorizing the one or more sub-scores or the compliance score to one or more score bands describing preselected value ranges for the one or more sub-scores or compliance score; and
  in which outputting the compliance score includes causing the one or more sub-scores or the compliance score to be presented, by the computer system to a user interface at a first party computing device or a third party computing device, as a member of one or more of the preselected value ranges.

12. The computer implemented method of claim 1, in which:
  the authorization is an electronic authorization received from a first party computing device; and
  selecting computational rules to apply to the stored first party data includes receiving one or more selected computational rules from a third party computing device.

13. The computer implemented method of claim 1, further comprising receiving, with the computer system, a request from the third party, by a third party computing device in communication with the computer system, to determine the compliance score based on the stored first party data and the computational rules.

14. The computer implemented method of claim 1, further comprising receiving, with the computer system, a request from the first party, by a first party computing device in communication with the computer system, to determine the compliance score based on the stored first party data and the computational rules.

15. The computer implemented method of claim 1, further comprising allowing, by the computer system, the first party to view the computational rules, on a first party computing device in communication with the computer system.

16. The computer implemented method of claim 1, further comprising allowing, by the computer system, the first party to apply the computational rules, with a command from a first party computing device in communication with the computer system.

17. The computer implemented method of claim 1, further comprising allowing, by the computer system, the first party to view the compliance score on a first party computing device in communication with the computer system.

* * * * *